(12) United States Patent
Jalagam et al.

(10) Patent No.: US 10,922,282 B2
(45) Date of Patent: Feb. 16, 2021

(54) ON-DEMAND COLLABORATION USER INTERFACES

(71) Applicant: Box, Inc., Redwood City, CA (US)

(72) Inventors: Sesh Jalagam, Union City, CA (US); Victor De Vansa Vikramaratne, Sunnyvale, CA (US)

(73) Assignee: Box, Inc., Redwood City, CA (US)

( * ) Notice: Subject to any disclaimer, the term of this patent is extended or adjusted under 35 U.S.C. 154(b) by 158 days.

(21) Appl. No.: 16/154,679

(22) Filed: Oct. 8, 2018

(65) Prior Publication Data

US 2019/0108240 A1 Apr. 11, 2019

Related U.S. Application Data

(60) Provisional application No. 62/570,075, filed on Oct. 9, 2017, provisional application No. 62/570,561, filed on Oct. 10, 2017.

(51) Int. Cl.
*G06F 16/176* (2019.01)
*G06F 16/28* (2019.01)
(Continued)

(52) U.S. Cl.
CPC ........ *G06F 16/176* (2019.01); *G06F 16/1734* (2019.01); *G06F 16/288* (2019.01); *G06F 16/9024* (2019.01)

(58) Field of Classification Search
CPC .. G06Q 50/01; G06Q 10/101; G06F 16/9024; G06F 16/338; G06F 16/345;
(Continued)

(56) References Cited

U.S. PATENT DOCUMENTS 10,606,866 B1 * 3/2020 Funk ................. G06F 16/951
2010/0161662 A1 * 6/2010 Jonas ................ G06F 16/288
707/780

(Continued)

OTHER PUBLICATIONS

Sesh Jalagam, "Box Graph: how we built a spontaneous social network", URL:https://blog.box.com/blog/box-graph-how-we-built-spontaneous-social-network, Nov. 28, 2017.
(Continued)

*Primary Examiner* — Evan Aspinwall
(74) *Attorney, Agent, or Firm* — Vista IP Law Group, LLP

(57) ABSTRACT

Systems and methods for on-demand generation of customizable collaboration network graphs. A method embodiment operates in a collaboration system that comprises content objects that are operated on by a plurality of users. Interactions with the content objects are detected and streamed into a customizable graph platform. Customization is accomplished by configuring the graph platform to gather particular events and corresponding data that pertain to the entity interaction events and/or to the users that raised the events. The graph platform organizes the data into data structures that codify a collaboration network graph, where the nodes of the collaboration network graph refer to customizable ones of the content objects and where the edges of the collaboration network graph refer to customizable parameters or values that characterize relationships between connected nodes of the collaboration network graph. Multiple behavior overlays can be applied to cause the customizable graph platform to process particular events differently.

20 Claims, 15 Drawing Sheets

(51) Int. Cl.
*G06F 16/17* (2019.01)
*G06F 16/901* (2019.01)

(58) Field of Classification Search
CPC .. G06F 16/9038; G06F 16/9536; G06F 17/18; G06F 16/176; G06F 16/288; G06F 16/1734; H04L 43/045; H04L 51/32; H04L 51/10; H04L 67/22; H04L 51/08; H04L 63/0227
USPC ........................................................ 707/608
See application file for complete search history.

(56) References Cited

U.S. PATENT DOCUMENTS

| | | | | |
|---|---|---|---|---|
| 2014/0025665 | A1* | 1/2014 | Tobin | G06F 16/24575 707/722 |
| 2014/0189530 | A1* | 7/2014 | Anand | G06Q 30/0201 715/753 |
| 2014/0207860 | A1* | 7/2014 | Wang | G06Q 10/10 709/204 |
| 2014/0244752 | A1* | 8/2014 | Tseng | H04N 21/4756 709/204 |
| 2014/0279039 | A1* | 9/2014 | Systrom | G06Q 30/0224 705/14.66 |
| 2015/0127628 | A1* | 5/2015 | Rathod | G06F 16/955 707/710 |
| 2016/0294894 | A1* | 10/2016 | Miller | H04L 63/102 |
| 2016/0350442 | A1* | 12/2016 | Crosby | G06F 16/24578 |
| 2016/0378757 | A1* | 12/2016 | Bahl | G06Q 10/101 707/728 |
| 2017/0142200 | A1* | 5/2017 | Kodner | H04L 67/22 |
| 2018/0097697 | A1* | 4/2018 | Bakshy | H04L 41/0823 |
| 2019/0034520 | A1 | 1/2019 | Jalagam et al. | |
| 2019/0034885 | A1 | 1/2019 | DeLand et al. | |
| 2019/0391861 | A1 | 12/2019 | Emerick et al. | |
| 2020/0074015 | A1 | 3/2020 | Vikramaratne et al. | |

OTHER PUBLICATIONS

"Plugins API—Docker Plugin API" (Nov. 7, 2015), URL:https://docs.docker.com/engine/extend/plugin_api/ (Publication date based on indicated capture date by Archive.org; first publication date unknown).

"Amazon API Gateway" (Jul. 10, 2015), URL:https://aws.amazon.com/api-gateway/ (Publication date based on indicated capture date by Archive.org; first publication date unknown).

Docker (software), Wikipedia.com, URL:https://en.wikipedia.org/wiki/Docker_(software), Aug. 21, 2017.

"Linux Container", Wikipedia.com, URL:https://pve.proxmox.com/wiki/Linux_Container, Jul. 4, 2017.

Keyvan Fatehi, "Docker in Docker", github.com, URL:https://github.com/moby/moby/wiki/Docker-in-Docker, May 20, 2014.

"Docker Plugin API" (Mar. 13, 2019), dockers.com, URL:https://docs.docker.com/v17.09/engine/extend/plugin_api/ (Publication date based on indicated capture date by Archive.org; first publication date unknown).

"Activity Stream—Wikipedia", URL:https://en.wikipedia.org/wiki/Activity_stream, Oct. 28, 2019.

Tata, Sandeep, et al. "Quick access: building a smart experience for Google drive." Proceedings of the 23rd ACM SIGKDD International Conference on Knowledge Discovery and Data Mining. ACM, 2017.

Reynolds, Douglas. "Gaussian mixture models." Encyclopedia of biometrics (2015): 827-832.

Schaeffer, Satu Elisa. "Graph clustering." Computer science review 1.1 (2007): 27-64.

Ioandre, "MCL Spark", URL:https://github.com/joandre/MCL_spark/blob/master/README.md, Mar. 4, 2017.

Berger, Jonathan. "Introducing a New Box Notes for Web and Desktop | Box Blog". Blog.Box.Com, Jan. 24, 2017, https://blog.box.com/blog/new-box-notes-web-desktop/. Accessed Jul. 9, 2018.

Yeh, Chris. "Simplifying Collaboration Across Web and Mobile | Box Blog". Blog.Box.Com, Nov. 10, 2014, https://blog.box.com/blog/simplifying-collaboration-across-web-and-mobile/. Accessed Jul. 9, 2018.

* cited by examiner

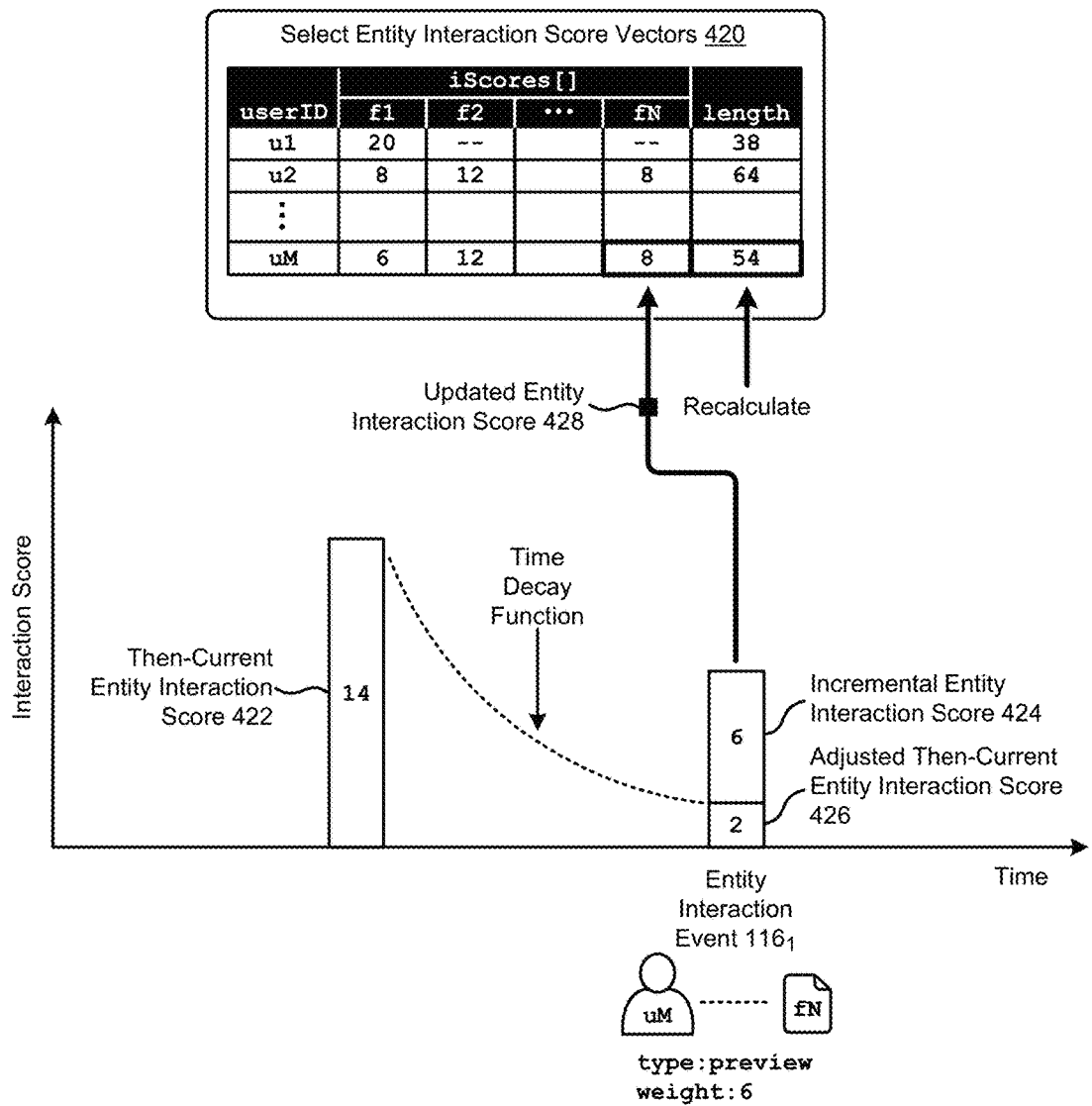
FIG. 4B1

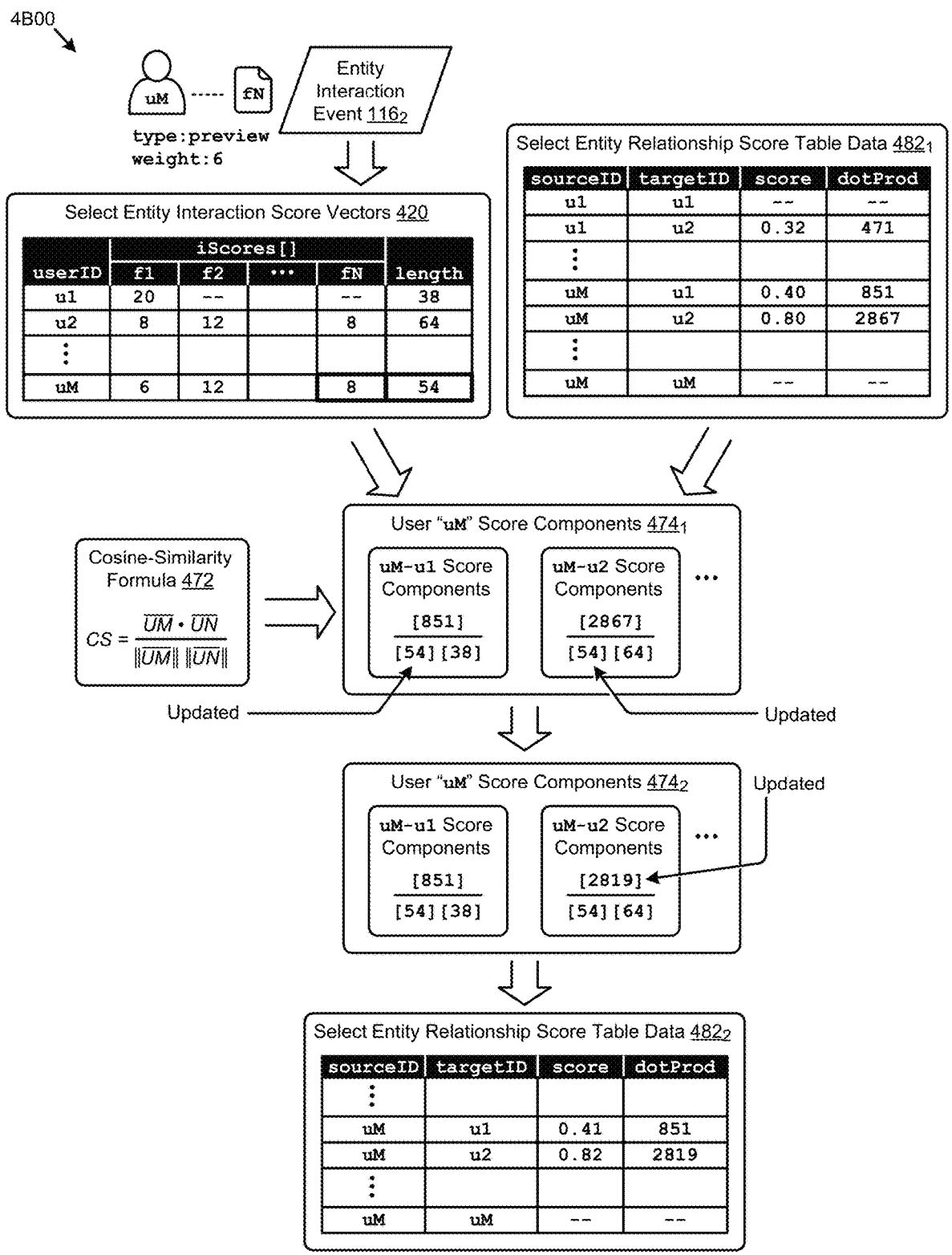
FIG. 4B2

ON-DEMAND COLLABORATION USER INTERFACES

CROSS REFERENCE TO RELATED APPLICATION(S)

The present application claims the benefit of priority to U.S. Patent Application Ser. No. 62/570,075 titled "SYSTEMS AND METHODS FOR COLLABORATION INSIGHT AND COMMUNICATION", filed Oct. 9, 2017, and the present application claims the benefit of priority to U.S. Patent Application Ser. No. 62/570,561 titled "SYSTEMS AND METHODS FOR COLLABORATION INSIGHT AND COMMUNICATION", filed Oct. 10, 2017, both of which are hereby incorporated by reference.

FIELD

This disclosure relates to collaboration systems, and more particularly to techniques for on-demand collaboration user interfaces.

BACKGROUND

Today's collaboration systems support thousands of users who collaborate over millions of content objects (e.g., files, folders, etc.) managed by the collaboration systems. A vast amount of collaboration activity can occur over the large number of users, content objects, and other entities associated with the collaboration systems. Such collaboration activity is often related to events involving user-to-object interactions (e.g., authoring, commenting, sharing, etc.) by users over the content objects. Collaboration events may also pertain to user-to-user interactions (e.g., messaging actions, chatting, object sharing invitations, etc.). By knowing more about such collaboration events, the users of the collaboration systems can seize additional benefits (e.g., improved productivity, etc.) of their collaboration. In some cases, knowledge of other information (e.g., user relationships, object relationships, user skills, etc.) not directly related to interaction events can also contribute to collaboration enhancement.

Some collaboration systems have developed a codebase to capture certain collaboration event information so as to offer users some insight into the continually-changing constituency of collaboration events. Such information might be used to offer the users indications of recent, trending, recommended, and/or other collaboration activities. Such indications might be presented to a particular user as one or more "feeds" in a user interface. As collaboration systems mature and as methodologies for human collaboration become more and more well developed and more and more prevalent, users might also continually demand new insights (e.g., new feeds) into collaboration activity that were not earlier considered.

One approach to addressing the demand for such "new insights" is to develop new code to add to the codebase so as to continuously monitor and capture aspects of collaboration events that are expected to facilitate delivery of newly-demanded insights to the users. In some cases, particular characteristics of the newly-demanded insights require more code to be developed so as to relate captured event information to other information (e.g., user location, user relationships, etc.). Furthermore, in some cases still more additional code might need to be added to the codebase to present the newly-demanded insights in a manner that fosters human cognition.

Unfortunately, the specialized nature of code development pertaining to newly-demanded insights presents barriers to delivering new collaboration activity insights. Moreover, such barriers are raised whenever new insights are demanded. New techniques are needed to reduce the code development effort needed to generate and deliver new collaboration activity insights to users of collaboration systems.

SUMMARY

The present disclosure describes techniques used in systems, methods, and in computer program products for forming on-demand collaboration networks, which techniques advance the relevant technologies to address technological issues with legacy approaches. More specifically, the present disclosure describes techniques used in systems, methods, and in computer program products for on-demand generation of collaboration networks. Certain embodiments are directed to technological solutions for implementing a framework at a collaboration system to facilitate on-demand generation of collaboration network graphs from user-specified configuration documents.

The disclosed embodiments modify and improve over legacy approaches. In particular, the herein-disclosed techniques provide technical solutions that address the technical problems attendant to reducing or eliminating the code development effort. Such technical solutions involve specific implementations (i.e., a specification language, data organization, data communication paths, module-to-module interrelationships, etc.) that relate to the software arts for improving computer functionality.

The problems solved by the embodiments arise in the realm of computer systems, and the techniques for implementing a framework for a collaboration system to facilitate on-demand generation of collaboration network graphs from high order configuration documents serve to overcome technological problems pertaining to delivering collaboration activity insights to users of collaboration systems.

Some embodiments advance peripheral technical fields as well. As specific examples, use of the disclosed computer equipment, networking equipment, and constituent devices within the shown environments as described herein and as depicted in the figures provide advances in the technical field of massively scalable computing systems as well as advances in various technical fields related to human-machine interfaces.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

FIG. 4B1 and FIG. 4B2 depict an entity relationship scoring scenario as performed in systems that facilitate on-demand generation of collaboration networks, according to an embodiment.

DETAILED DESCRIPTION

Figure 1:
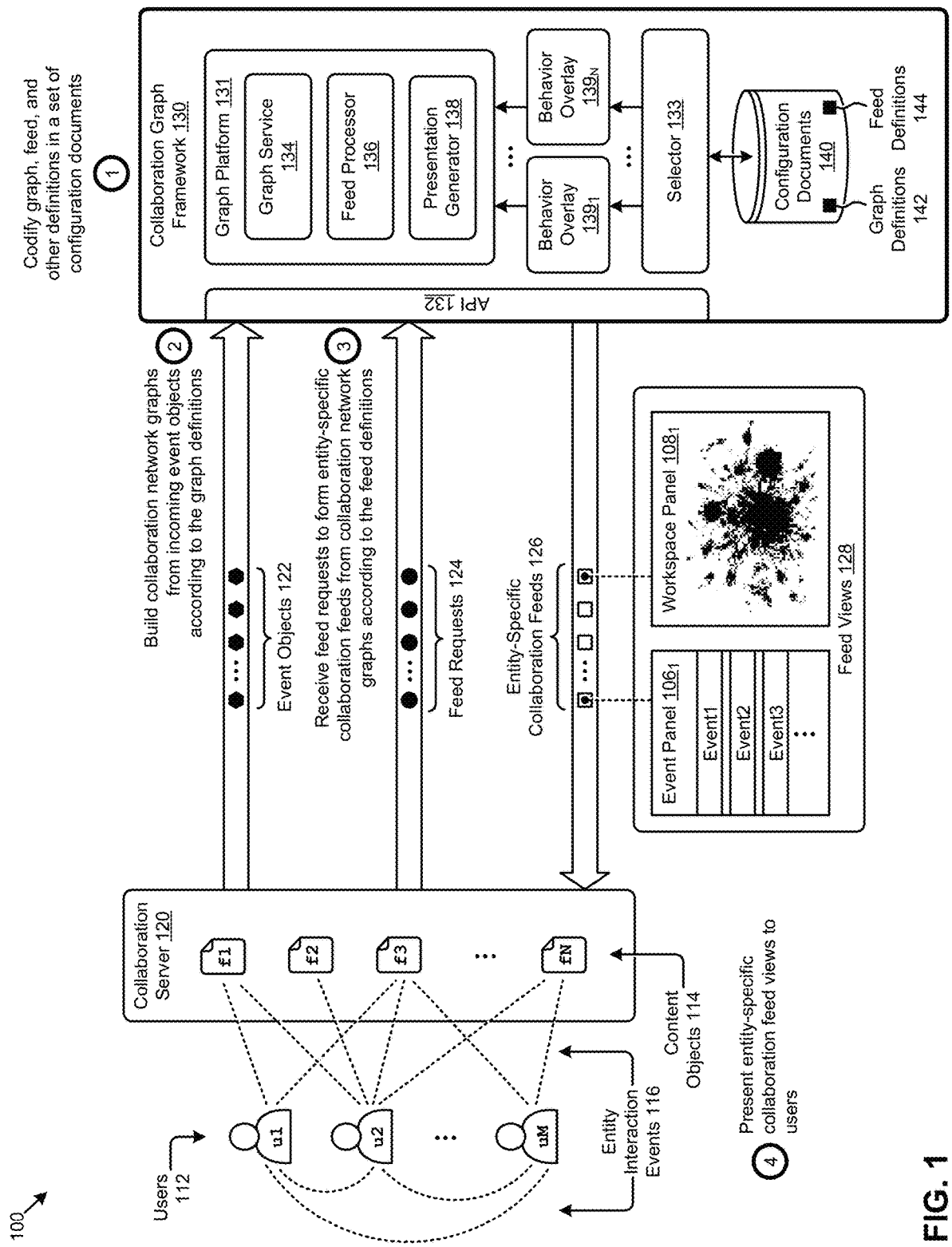
FIG. 1 illustrates a computing environment in which embodiments of the present disclosure can be implemented.

Embodiments in accordance with the present disclosure serve to reduce or eliminate the code development effort needed to deliver collaboration activity insights to users of collaboration systems. Some embodiments are directed to approaches for implementing a framework at a collaboration system to facilitate on-demand generation of collaboration network graphs from text-oriented configuration documents. The accompanying figures and discussions herein present example environments, systems, methods, and computer program products for on-demand generation of collaboration user interfaces.

Overview

Disclosed herein are techniques for implementing a framework at a collaboration system to facilitate on-demand generation of collaboration network graphs based on high order configuration documents. In certain embodiments, the framework comprises a graph service that maintains in real time a plurality of collaboration network graphs according to respective graph definitions codified in the configuration documents. The collaboration network graphs are continually updated by the graph service as entity interaction events and/or as other non-interaction data are received. Feed definitions specified in the configuration files identify a collaboration network graph or combination of graphs that are to be used to generate a particular feed. Feed requests received at the graph service are processed to produce a respective set of feed objects derived from the then-current set of collaboration network graphs. Each set of feed objects corresponds to a particular entity-specific collaboration feed. A graph presentation generator creates various visual elements (e.g., activity message lists, bubble charts, network charts, cluster diagrams, etc.) from the feed objects to present representations of the entity-specific collaboration feeds at one or more user interfaces.

Using the foregoing framework, by merely adding one or more graph definitions and a feed definition that references the one or more graph definitions, new insights into collaboration activity can be quickly delivered to users. In certain embodiments, an API is implemented at the framework to receive any combination of events, feed requests, external data, etc. In certain embodiments, a plurality of behavior overlay modules are implemented in the framework to receive any combination of graph definitions and feed definitions.

In certain embodiments, the edges of the collaboration network graphs are assigned respective scores by the graph service, which scores are considered, for example, when creating the visual representations of the entity-specific collaboration feeds. In certain embodiments, a feed testing capability is included in the framework to verify that the operation of a particular feed comports with corresponding feature definitions as codified in the configuration files. In certain embodiments, the configuration documents are uncompiled, structured text documents.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates one aspect pertaining to implementing a framework at a collaboration system to facilitate on-demand generation of collaboration network graphs from high order configuration documents. Specifically, the figure presents a logical depiction of how the framework and herein disclosed techniques can be implemented and used in a collaboration system comprising many interrelated entities (e.g., users, content objects, etc.) from which certain collaboration activity insights can be derived.

The entities of the collaboration system represented in FIG. 1 comprise a set of users 112 (e.g., user "u1", user "u2", . . . , user "uM") who interact with a set of content objects 114 (e.g., file "f1", file "f2", file "f3", . . . , file "fN"). Access to and/or interaction with content objects 114 by users 112 can be facilitated by a collaboration server 120. Content objects 114 can be any content object (e.g., file, folder, document, image, video, etc.) from a shared content repository managed by collaboration server 120. Other types of entities in the collaboration system are possible. For example, entities might include certain agents (e.g., applications, apps, etc.) that can interact with content objects 114 independently from any direct involvement by users 112. When entities interact with one another in a set of entity interaction events 116, an entity relationship between the entities is formed. For example, an entity relationship is formed between user "u1" and file "f3" when user "u1" edits file "f3". The entity relationships formed by entity interaction events 116 are often ephemeral in nature. As an example, a user-to-object interaction that occurred one year ago may not have much meaning today.

Entity relationships can also be formed by certain affinities between entities. For example, an entity relationship between user "u2" and user "uM" might exist due to the users both being located in California and/or assigned to the same project. In these cases, the entity relationship is based at least in part on the attributes (e.g., user attributes, content object attributes, etc.) of the entities. Entity relationships formed from persistent entity affinities (e.g., department assignments, etc.) are often more long-lived as compared to entity relationships formed from entity interaction events 116 due to the entity affinities having a propensity to remain effective for longer periods of time (e.g., users remain in the same office location). As yet another example, entity relationships might form in response to an affinity produced as a result of one or more entity interactions. Specifically, user "u2" and user "uM" might have an entity relationship as a result of an affinity that resulted from their respective interactions with content object "f3".

As earlier mentioned, by knowing more about the foregoing collaboration activity and events (e.g., via entity interaction events 116, and/or via entity affinities, etc.), users 112 of the collaboration system can seize the benefits (e.g., improved productivity, etc.) of collaboration. However, the specialized nature of the code development effort presents barriers to delivering new collaboration activity insights. As shown in FIG. 1, the herein disclosed techniques address such barriers by implementing a graph platform 131 at the collaboration system to facilitate on-demand generation of collaboration network graphs based on high order configuration documents. A collaboration network graph, as used herein, is a logical representation of the entities of a collaboration system and their relationships, where the nodes of the collaboration network graph correspond to the entities and the edges of the collaboration network graph correspond to the entity relationships.

As discussed further herein, the characteristics of the collaboration network graphs are codified in various sets of graph data. As can be observed, a set of configuration documents 140 at collaboration graph framework 130 comprise various instances of graph definitions 142 and feed definitions 144 that are accessed to carry out the herein disclosed techniques (operation 1). A graph service 134 at collaboration graph framework 130 builds and maintains in real time a plurality of collaboration network graphs according to graph definitions 142. More specifically, as each event object from a stream of event objects 122 are received at an API 132 of collaboration graph framework 130, graph service 134 updates a corresponding one or more collaboration network graphs associated with the received event object in accordance with graph definitions 142 (operation 2).

The processing of graph service 134 of graph platform 131 can be customized by one or more behavior overlays (e.g., behavior overlay $139_1$, . . . , behavior overlay $139_N$). The behavior overlays in turn can be configured by applying one or more of the configuration documents. As one example, the API is able to control selector 133 to retrieve a particular one of the graph definitions 142 and apply the semantics of the graph definitions 142 to particular behavior overlays. A behavior overlay modifies how the graph service works, and/or a behavior overlay modifies (e.g., customizes) how the feed processor works, and/or a behavior overlay modifies (e.g., customizes) how the presentation generator works. In some embodiments, a behavior overlay may comprise a repository for parameter values, which parameter values are applied to a corresponding parameter to control the behavior of graph platform 131. In some embodiments, a behavior overlay may comprise executable code, which code, when executed, serves to control the behavior of graph platform 131. In yet other embodiments, a behavior overlay may comprise one or more formulas, which formulas, when evaluated, serve to control the behavior of graph platform 131. In some cases, a behavior overlay controls how event objects are included or excluded from consideration by components of the graph platform.

Continuing with the discussion of techniques for building collaboration network graphs (operation 2), event objects 122 are streamed into the collaboration graph framework using any known technique. As depicted here, event objects are programming objects that comprise various information (e.g., attributes, parameters, etc.) associated with a particular event (e.g., entity interaction event, entity affinity event, etc.) that has been raised at collaboration server 120. In some cases, event objects or any other object described herein might be codified (e.g., in JSON format) in the payload of a message such as an HTTP call and/or such as in a call to an API 132. A graph definition, as used herein, is a set of information that can be used to form one or more constraints to apply to certain functions and/or operations when creating or updating a corresponding collaboration network graph. In certain embodiments, portions of a graph definition stored in one configuration document may reference information (e.g., specifications, formulas, etc.) stored in one or more other configuration documents. In some cases, the information comprising a graph definition is recorded as uncompiled, structured text in the configuration documents (e.g., files) to facilitate efficient development of new graph definitions.

Instances of feed requests 124 are received at API 132 of collaboration graph framework 130 to form entity-specific collaboration feeds from the collaboration network graphs in accordance with respective instances of feed definitions 144 referenced by the feed requests (operation 3). Such feed requests are messages that comprise various information (e.g., feed definition identifiers, entity identifiers, etc.) that is used to form a particular entity-specific collaboration feed from the collaboration network graphs. In some cases, the message information of feed requests 124 might be codified in HTTP calls to API 132. A feed definition, as used herein, is a set of information that can be used to form one or more constraints to apply to certain functions and/or operations when creating or updating an entity-specific collaboration feed.

In certain embodiments, portions of a feed definition stored in one configuration document may reference information (e.g., graph definitions, specifications, formulas, etc.) stored in one or more other configuration documents. In some cases, the information comprising a feed definition is recorded as uncompiled, structured text in the configuration documents (e.g., files) to facilitate efficient development of new feed definitions. An entity-specific collaboration feed, as used herein, is a set of programming objects that describe certain collaboration insight as pertains to a particular entity (e.g., user). For example, an entity-specific collaboration feed for a user might comprise feed objects that describe trending collaboration events that are deemed to be of interest to the user. In some cases, feed requests 124 might be received (e.g., from an agent or app at collaboration server 120) at a feed processor 136 included in collaboration graph framework 130 while, in other cases, feed processor 136 might generate the feed requests.

The instances of entity-specific collaboration feeds 126 formed in response to feed requests 124 are presented to the respective users (or other entities) associated with the requests (operation 4). Specifically, a presentation generator 138 at collaboration graph framework 130 can generate various visual elements from entity-specific collaboration feeds 126 to present in user interfaces associated with the users. As illustrated, feed views 128 generated by presentation generator 138 might include a list of event messages presented in an event panel $106_1$ of a user interface, or a cluster diagram presented in a workspace panel $108_1$ of a user interface.

Using the foregoing framework, by merely adding one or more graph definitions and a feed definition that references the one or more graph definitions, a new insight into collaboration activity can be quickly delivered to users. The graph definitions and feed definitions are generalized such that behavior of the graph platform can be modified merely by changing a value of a parameter, or by adding or removing a parameter from a definition. Strictly as examples, a department manager might want to gain insight into "power users" in his or her department, whereas a site manager might want to gain insight into "power users" throughout his or her site. Using the graph definitions, and by merely changing a value of a parameter, such customization can be codified in a single line of text. As further examples, a user might want to know which documents pertain to a particular topic are being reviewed by his or her colleagues. Using the graph definitions and/or feed definitions, and by merely (for example) changing a value of a "topic" parameter to indicate the topic of interest, the user can specify generation of a graph that captures activities over documents that pertain to the topic of interest. At any moment in time, the user can request a feed that presents (for example) a collaboration graph that depicts which users are performing which activities in the documents that pertain to the specified topic of interest.

Additional embodiments and use cases for generating collaboration graphs and displaying insights based on collaboration activity is disclosed in further detail as follows.

Figure 2:
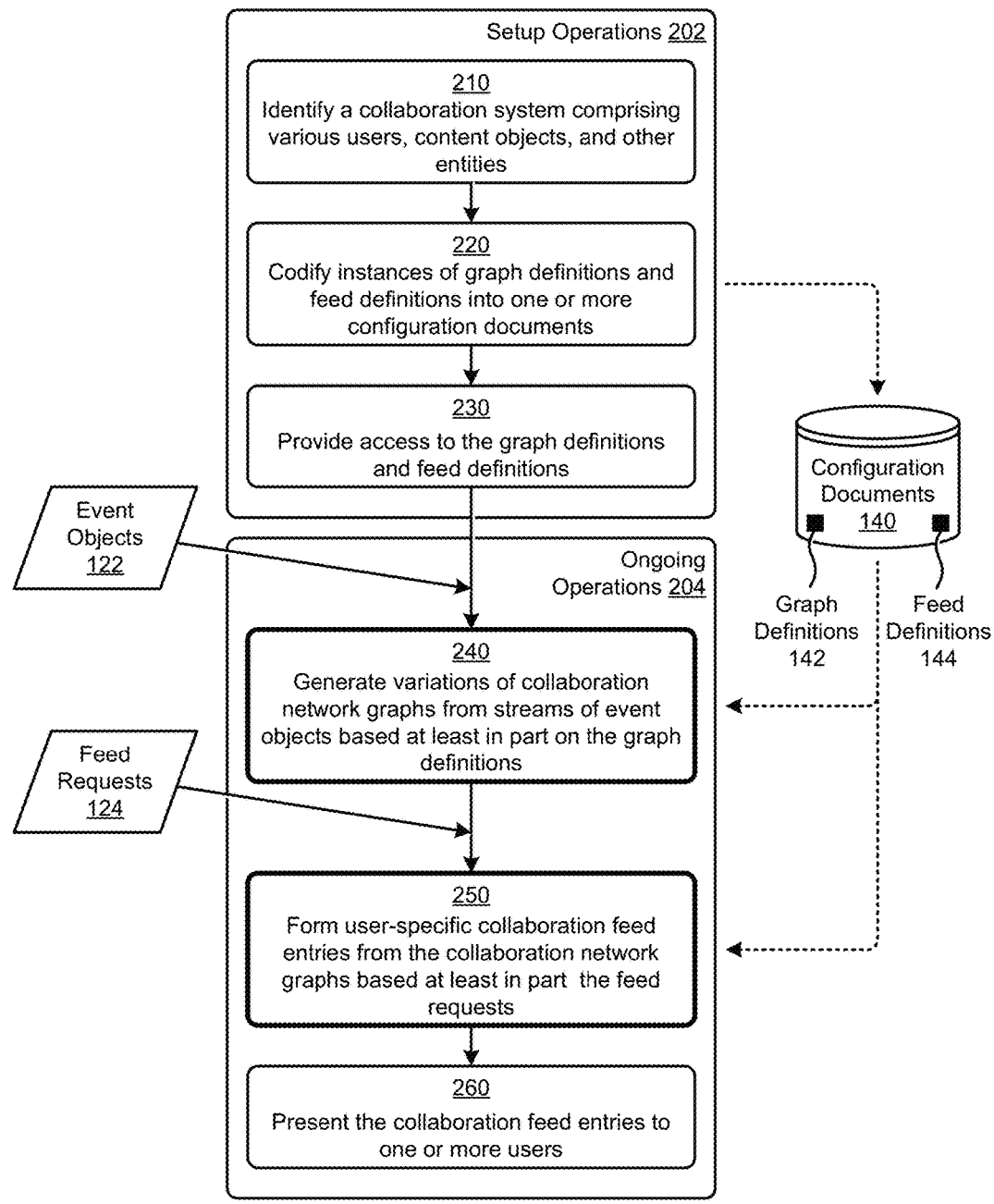
FIG. 2 depicts a collaboration network activity management technique as implemented in systems that facilitate on-demand generation of collaboration networks, according to an embodiment.

FIG. 2 depicts a collaboration network activity management technique 200 as implemented in systems that facilitate on-demand generation of collaboration networks. As an option, one or more variations of collaboration network activity management technique 200 or any aspect thereof may be implemented in the context of the architecture and functionality of the embodiments described herein. The collaboration network activity management technique 200 or any aspect thereof may be implemented in any environment.

FIG. 2 illustrates one aspect pertaining to implementing a framework at a collaboration system to facilitate on-demand generation of collaboration network graphs from high order configuration documents. Specifically, the figure is presented to illustrate one embodiment of certain steps and/or operations for performing the foregoing on-demand generation of collaboration network graphs and generating entity-specific collaboration feeds from such graphs without requiring extensive specialized code development. As can be observed, the steps and/or operations can be grouped into a set of setup operations 202 and a set of ongoing operations 204.

The setup operations 202 of the collaboration network activity management technique 200 can commence by identifying a collaboration system comprising various users, content objects, and other entities (step 210). Various instances of graph definitions and feed definitions are recorded in one or more configuration documents (step 220). As illustrated, graph definitions 142 and feed definitions 144 might be recorded in various files comprising configuration documents 140. Access to the graph definitions and feed definitions is provisioned to various components and/or services at the collaboration system (step 230). Access can be provided by an API or by granting access permissions to persistent storage locations where the graph definitions and feed definitions are stored.

The ongoing operations 204 include generating variations of collaboration network graphs from streams of events (e.g., as codified in event objects 122) in accordance with the graph definitions (step 240). For example, a collaboration network graph that captures recent collaboration activity might be maintain in accordance with a "recent-actions" graph definition. In response to receiving feed requests (e.g., feed requests 124), respective instances of entity-specific collaboration feeds are formed from the collaboration network graphs based at least in part on the feed definitions referenced by the requests (step 250). As an example, a feed request for user "u1" might reference a "news-feed" feed definition that queries the "recent-actions" collaboration network graph for the recent collaboration activity relevant to user "u1". The entity-specific collaboration feeds are then presented to one or more of the users at the collaboration system (step 260). In the foregoing examples, a list of activity events might be presented in rank order (e.g., by time, relevance, etc.) to user "u1".

One embodiment of a system, data flows, and data structures for implementing the collaboration network activity management technique 200 and/or other herein disclosed techniques is disclosed as follows.

Figure 3A:
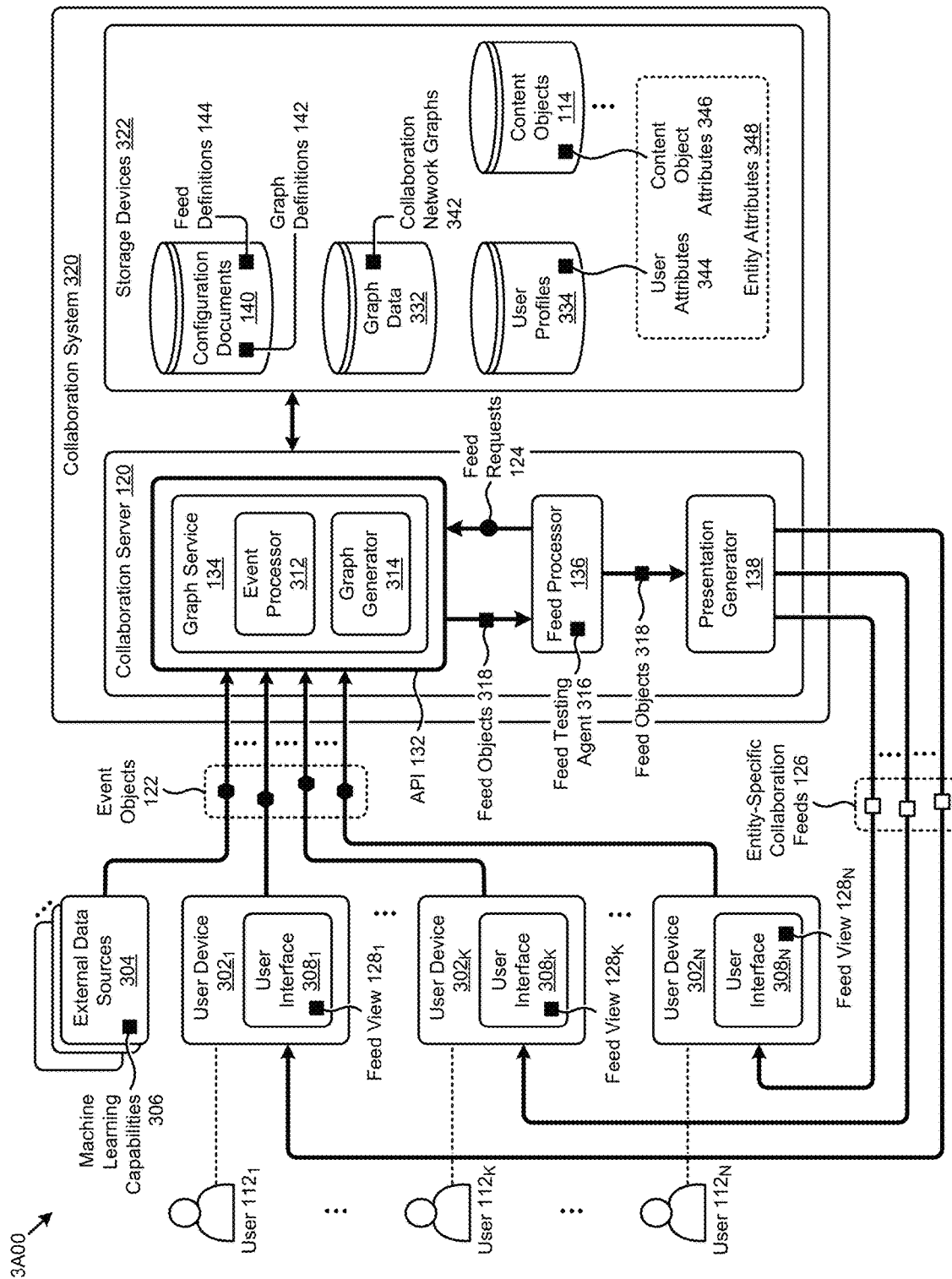
FIG. 3A is a block diagram of a system that facilitates on-demand generation of collaboration networks, according to an embodiment.

FIG. 3A is a block diagram of a system 3A00 that facilitates on-demand generation of collaboration networks. As an option, one or more variations of system 3A00 or any aspect thereof may be implemented in the context of the architecture and functionality of the embodiments described herein. The system 3A00 or any aspect thereof may be implemented in any environment.

FIG. 3A illustrates one aspect pertaining to implementing a framework at a collaboration system to facilitate on-demand generation of collaboration network graphs from high order configuration documents. Specifically, the figure is being presented to show one embodiment of certain representative components and associated data structure and data flows that describes how the herein disclosed techniques might be implemented in a computing environment that comprises a collaboration system 320 accessed by one or more users from their respective user devices. The components, data flows, and data structures shown in FIG. 3A present one partitioning and associated data manipulation approach. The specific example shown is purely exemplary, and other subsystems, data structures, and/or partitioning are reasonable.

As shown, the system 3A00 comprises an instance of API 132, graph service 134, feed processor 136, and presentation generator 138 earlier described operating at an instance of collaboration server 120 in a collaboration system 320. A set of storage devices 322 accessible by collaboration server 120 are configured to store any number or type of configuration documents 140 that either singly or in combination comprise graph definitions 142 and feed definitions 144. In the embodiment of FIG. 3, graph service 134 comprises an event processor 312 and a graph generator 314. A plurality of instances of the foregoing components might operate at a plurality of instances of collaboration server 120 in collaboration system 320 and/or any portion of system 3A00. Such instances can access a set of storage devices 322 that store various information that facilitates operation of the system 3A00 and/or implementation of the herein disclosed techniques.

For example, collaboration server 120 might facilitate access to shared content in content objects 114 by a plurality of users (e.g., user $112_1$, ..., user $112_K$, ..., user $112_N$) from a respective set of user devices (e.g., user device $302_1$, ..., user device $302_K$, ..., user device $302_N$). The objects (e.g., files, folders, etc.) in content objects 114 are characterized at least in part by a set of content object attributes 346 (e.g., content object metadata) stored at the storage devices 322. Furthermore, the users are characterized at least in part by a set of user attributes 344 (e.g., name, role, location, etc.) stored in a set of user profiles 334 at storage devices 322. User attributes 344 might further comprise object access attributes (e.g., access permissions, etc.) that might be derived at least in part from various policies and/or access rules. As can be observed, user attributes 344 and/or content object attributes 346 and/or other attributes comprise a set of entity attributes 348 that might be accessed according to one or more of the herein disclosed techniques.

Further details regarding general approaches to object access attributes are described in U.S. application Ser. No. 16/136,207 titled "FILTERING COLLABORATION ACTIVITY", filed on Sep. 19, 2018, which is hereby incorporated by reference in its entirety.

The users can interact with user interfaces or application workspaces (e.g., user interface $308_1$, ..., user interface $308_K$, ..., user interface $308_N$) at the user devices to invoke instances of event objects 122 at system 3A00. Event processor 312 at graph service 134 detects occurrences of event objects 122 received at API 132. As an example, event objects 122 might be issued to API 132 in the payload of one or more HTTP calls. In some cases, instances of event objects 122 might be issued from one or more external data sources 304. For example, an external data source might be a cloud-based service that computes various entity affinities using machine learning capabilities 306. As another example, certain algorithms that process historical data can compute full or partial graphs using standard machine learning algorithms such as algorithms to compute a Jaccard index, or to perform matrix factorization, etc. Results of performing such algorithms on a graph and/or results of computations can be stored in graph data 332. The mechanism for storing results or computations in the graph data can be specified in any one or more configuration documents 140. Furthermore, performance of the foregoing machine learning algorithms and/or performing calculations on a graph may be invoked at computing platforms that are outside of the collaboration system (e.g., using a third-party vendor's platform).

Further details regarding general approaches to computing entity affinities are described in U.S. application Ser. No. 16/136,196 titled "PRESENTING COLLABORATION ACTIVITIES", filed on Sep. 19, 2018, which is hereby incorporated by reference in its entirety.

Event attributes from event objects and/or other information (e.g., from entity attributes 348) are delivered to graph generator 314. Graph generator 314 updates various instances of collaboration network graphs 342 stored at collaboration system 320 in response to receiving the event object information from event processor 312. Specifically, graph generator 314 will update a particular one or more collaboration network graphs based at least in part on the graph definition and other event attributes that are associated with a particular event object.

A set of graph data 332 stored at storage devices 322 codifies the characteristics of the collaboration network graphs 342. For example, graph data 332 codifies the entities (e.g., nodes) and entity relationships (e.g., edges) of the graphs, and/or other entity attributes and entity relationship attributes (e.g., scores, weights, strengths, etc.) associated with the graphs.

Feed requests 124 issued by feed processor 136 to graph service 134 produce sets of feed objects 318 from one or more of collaboration network graphs 342. The feed requests 124 reference a feed definition from feed definitions 144 which in turn references one or more graph definitions 142. The definition parameters and/or other information form a graph query scope, which scope is applied to graph data 332 to derive feed objects 318. Such feed objects are programming objects that describe one or more of the entity-specific collaboration feeds earlier defined. Feed requests 124 might be composed and issued by feed processor 136 in response to instructions from other components (e.g., an app at the user devices) in system 3A00. In certain embodiments, a feed testing agent 316 might be implemented at feed processor 136 to facilitate efficient testing of certain features associated with one or more feed definitions. As can be observed, feed objects 318 received at feed processor 136 are forwarded to presentation generator 138 to generate various instances of entity-specific collaboration feeds 126 that are presented in various feed views (e.g., feed view $128_1$, . . . , feed view $128_K$, . . . , feed view $128_N$) at the user devices.

Further details of the data structures associated with the foregoing stored data and/or other data objects accessed by the herein disclosed techniques are disclosed as follows.

Figure 3B:
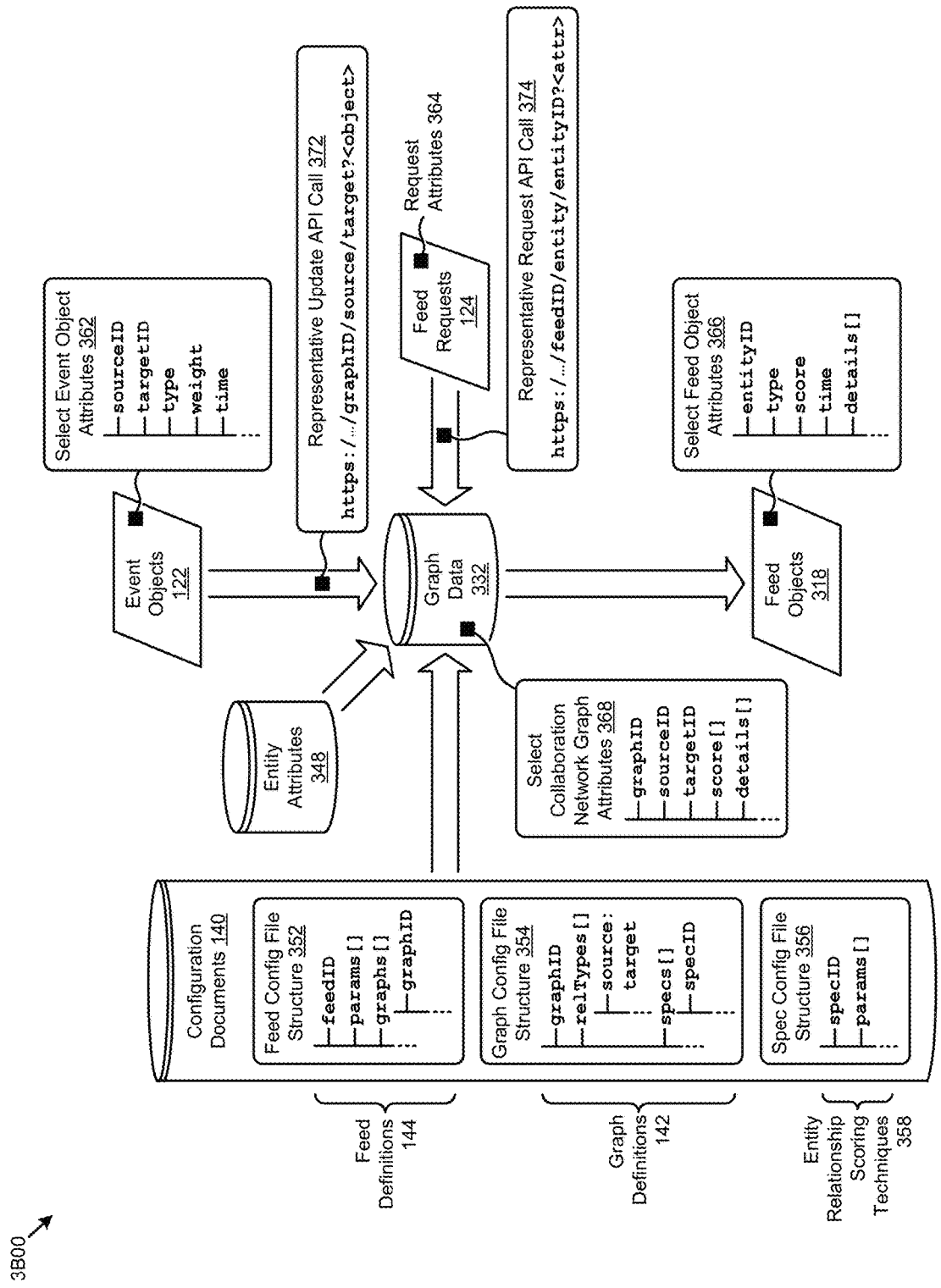
FIG. 3B depicts a set of representative data structures for organizing information in systems that facilitate on-demand generation of collaboration networks, according to an embodiment.

FIG. 3B depicts a set of representative data structures 3B00 for organizing information in systems that facilitate on-demand generation of collaboration networks. As an option, one or more variations of representative data structures 3B00 or any aspect thereof may be implemented in the context of the architecture and functionality of the embodiments described herein. The representative data structures 3B00 or any aspect thereof may be implemented in any environment.

FIG. 3B illustrates one aspect pertaining to implementing a framework at a collaboration system to facilitate on-demand generation of collaboration network graphs from high order configuration documents. Specifically, the figure is being presented to illustrate one embodiment of data structures that can be implemented to organize certain data used when implementing the herein disclosed techniques. The figure furthers illustrates a logical depiction of data flows of such data in an example scenario as performed in accordance with the herein disclosed techniques.

The data sets described herein can be organized and/or stored using various techniques. Specifically, the data structures corresponding to the data sets shown in FIG. 3B are designed to improve the way a computer stores and retrieves data in memory when performing steps and/or operations pertaining to on-demand generation of collaboration networks. For example, the data comprising event objects 122 might be organized and/or stored in a tabular structure (e.g., relational database table) that has rows that relate various attributes, such as source and target entity identifiers, that pertain to a particular entity interaction event. As another example, the information might be organized and/or stored in a programming code object that has instances corresponding to a particular entity interaction event and properties corresponding to the various attributes associated with the event.

As depicted by a set of select event object attributes 362, an entity interaction event data record (e.g., table row or object instance) for a particular entity interaction event might describe a source (or first) entity identifier (e.g., stored in a "source ID" field), a target (or second) entity identifier (e.g., stored in a "target ID" field), a description of the event or interaction type (e.g., stored in a "type" field), a weight associated with the event or interaction type (e.g., stored in a "weight" field), an event timestamp (e.g., stored in a "time" field), and/or other interaction attributes. As indicated by a representative update API call 372, an event object might be included (e.g., in an "<object>" argument list) in an HTTP call (e.g., a POST) that identifies a particular graph (e.g., specified by a "graphID" field) and source and target entity assignment (e.g., specified by a "source" field and a "target" field) over which to apply the event object. An example event object is shown in Table 1.

TABLE 1

Example event object

| Line | Content |
|---|---|
| 1 | [ |
| 2 | { |
| 3 | "source": "enterprise1", |
| 4 | "target": "location1", |
| 5 | "weight": 1, |
| 6 | "time": 1537298532000 |
| 7 | } |
| 8 | ] |

As an example of another data structure implementation, configuration documents 140 might comprise various configuration files that comprise graph definitions 142, feed definitions 144, entity relationship scoring techniques 358, and/or other information. To achieve the reduction or elimination of the specialized coding effort associated with introducing new collaboration insights as facilitated by the herein disclosed techniques, such configuration files might merely comprise uncompiled structured text. For example, the information in the configuration files might comprise parameters and parameter values codified as text-based key-value pairs (e.g., "key=value"). As another example, certain attributes might be marked (e.g., for parsing) in the configuration files by certain tags or characters (e.g., "[attribute]"). Specifically, a feed config file structure 352 indicates a corresponding configuration file in configuration documents 140 that might include certain information associated with each instance of feed definitions 144, such as a feed definition identifier (e.g., associated with a "feedID" key), one or more feed parameters (e.g., associated with a "params[ ]" object), one or more graph definitions (e.g., associated with a "graphs[ ]" object), and/or other feed definition information. As can be observed, the "graphs[ ]" object might include a graph definition identifier (e.g., associated with a "graphID" key) for each graph definition referenced by a feed definition. An example feed definition is shown in Table 2.

TABLE 2

Example feed definition

| Line | Content |
|---|---|
| 1 | [news-feed] |
| 2 | graph=recent-action-events |
| 3 | minUsers=100 |
| 4 | maxFilesPerUser=100 |
| 5 | maxEvents=10 |
| 6 | sortByScore=true |
| 7 | mostRecentEvent=false |

Each "graphID" attribute included in feed definitions 144 references a particular instance of graph definitions 142 as described in one or more configuration files. Specifically, a graph config file structure 354 indicates a corresponding configuration file in configuration documents 140 that might include certain information associated with each instance of graph definitions 142, such as a graph definition identifier (e.g., associated with a "graphID" key), one or more entity relationship types (e.g., associated with a "relTypes[ ]" object), one or more entity relationship scoring techniques (e.g., associated with a "specs[ ]" object), and/or other graph definition information. As indicated, the "relTypes[ ]" object might describe one or more pairs of source and target entity types (e.g., stored as a "source:target" pair). Furthermore, the "specs[ ]" object might describe a scoring technique identifier (e.g., associated with a "specID" key) for each scoring technique referenced by a graph definition. An example graph definition is shown in Table 3.

TABLE 3

Example graph definition

| Line | Content |
|---|---|
| 1 | [recent-action-events] |
| 2 | relTypes=user:file,user:comment,file:modify,... |
| 3 | spec=overwrite |
| 4 | spec.bidirectional=false |

Each "specID" attribute included in graph definitions 142 references a particular instance of an entity relationship scoring technique described in one or more configuration files in configuration documents 140. Specifically, a spec config file structure 356 indicates a corresponding configuration file in configuration documents 140 that might include certain information associated with each instance of entity relationship scoring techniques 358, such as a technique identifier (e.g., associated with a "specID" key), one or more parameters associated with the technique (e.g., associated with a "parameters[ ]" object), and/or other entity relationship scoring technique information. Example entity relationship scoring technique descriptions are shown in Table 4.

TABLE 4

Example entity relationship scoring technique definitions

| Line | Content |
|---|---|
| 1 | [overwrite] |
| 2 | bidirectional=false |
| 3 | [backward-time-decay] |
| 4 | maxDaysToDecay=31 |
| 5 | maxScore=10000000 |
| 6 | maxTimeToDedupeMs=360000 |
| 7 | limitMultiplier=1.5 |

As illustrated in FIG. 3B, event objects 122, entity attributes 348, and at least a portion of the information associated with configuration documents 140 are accessed to form various instances of graph data 332. A set of select collaboration network graph attributes 368 indicate that data records (e.g., table rows or object instances) associated with a particular collaboration network graph might describe various attributes corresponding to the pairwise entity relationships comprising the graphs. Specifically, the data records might describe a graph identifier (e.g., stored in a "graphID" field), a source (or first) entity identifier (e.g., stored in a "sourceID" field), a target (or second) entity identifier (e.g., stored in a "target ID" field), one or more score components associated with entity relationships between the source entity and the target entity (e.g., stored in a "score[ ]" object), one or more details pertaining to the entities and/or the entity relationship of the pair (e.g., stored in a "details[ ]" object), and/or other attributes of the pairwise entity relationship.

In response to instances of feed requests 124 applied over the collaboration network graphs stored in graph data 332, respective instances of feed objects 318 are produced. As indicated by a representative request API call 374, a feed request might be issued as an HTTP call (e.g., GET call) that specifies various instances of request attributes 364 in the call. As can be observed in representative request API call 374, such request attributes might include a particular feed definition (e.g., specified by a "feedID" field), an entity type (e.g., specified by an "entity" field), an entity identifier (e.g., specified by an "entityID" field), and one or more entity attributes or details to return in the response (e.g., specified in an "<attr>" argument list). The feed objects returned in response to a particular feed request are often entity-specific (e.g., for the entity identified by "entityID").

A set of select feed object attributes 366 indicate that each feed object instance produced in response to a feed request might comprise an entity identifier for a subject entity (e.g., stored in an "entityID" field), a description of the entity type for the subject entity (e.g., stored in a "type" field), a score associated with the feed object (e.g., stored in a "score" field), a timestamp associated with the feed object and/or an underlying event (e.g., stored in a "time" field), one or more details (e.g., entity attributes) associated with the subject entity (e.g., stored in a "details[ ]" object), and/or other feed object attributes. An example feed object is shown in Table 5.

TABLE 5

Example feed object

| Line | Content |
|---|---|
| 1 | [ |
| 2 | { |
| 3 | entityID: "5745857184", |
| 4 | type: "file", |
| 5 | score: 0.0000982734509874, |
| 6 | time: 1536627039000, |
| 7 | details: [ |
| 8 | { |
| 9 | owner: true, |
| 10 | roleIDs: [ ], |
| 11 | type: "AccessLevel" |
| 12 | } |
| 13 | ] |
| 14 | } |
| 15 | ] |

The foregoing discussions include techniques for generating various collaboration networks graphs from event objects and graph definitions (e.g., step 240 of FIG. 2), which techniques are disclosed in further detail as follows.

Figure 4A:
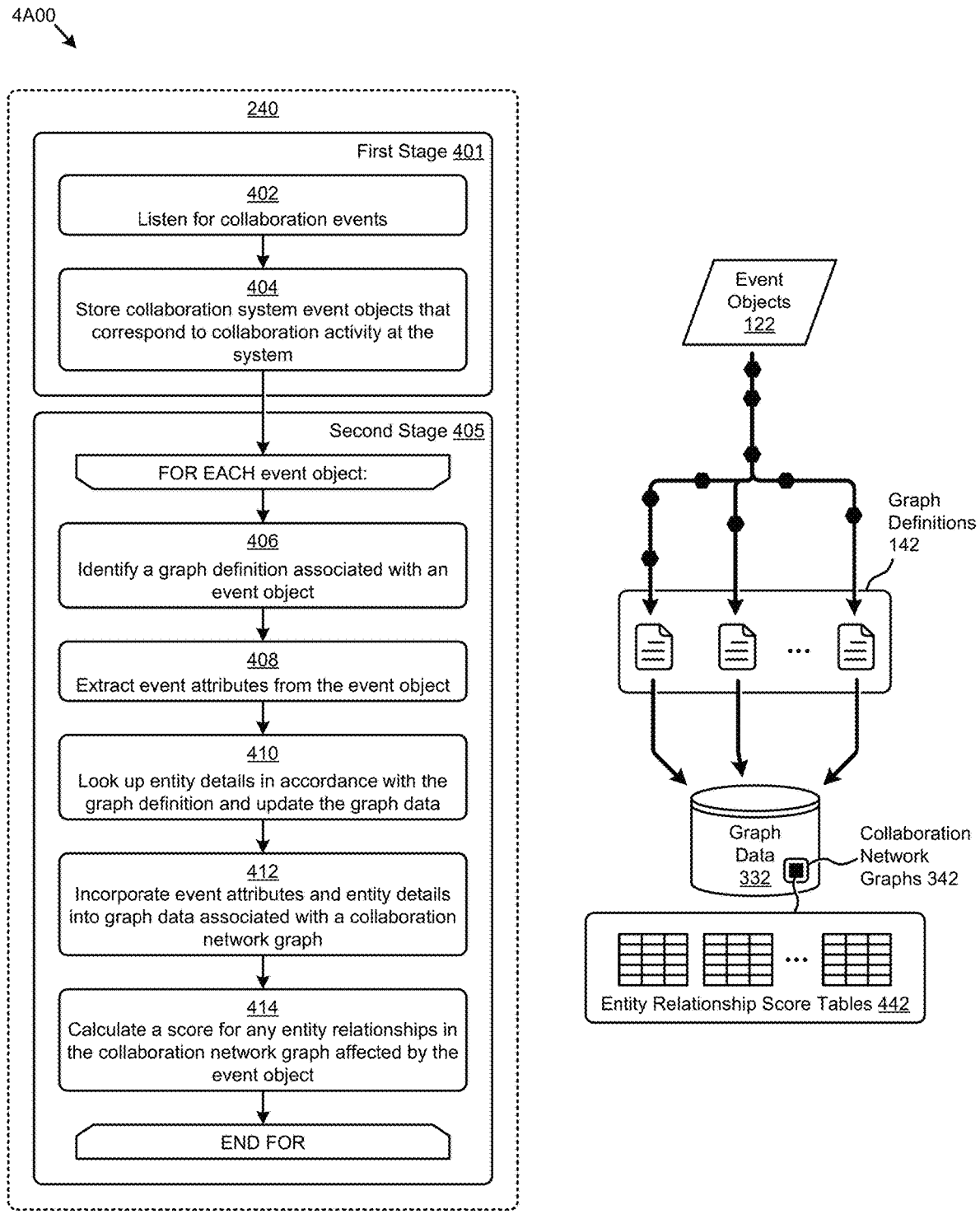
FIG. 4A presents a collaboration network graph management technique as implemented in systems that facilitate on-demand generation of collaboration networks, according to an embodiment.

FIG. 4A presents a collaboration network graph management technique 4A00 as implemented in systems that facilitate on-demand generation of collaboration networks. As an option, one or more variations of collaboration network graph management technique 4A00 or any aspect thereof may be implemented in the context of the architecture and functionality of the embodiments described herein. The collaboration network graph management technique 4A00 or any aspect thereof may be implemented in any environment.

FIG. 4A illustrates one aspect pertaining to implementing a framework at a collaboration system to facilitate on-demand generation of collaboration network graphs from high order configuration documents. Specifically, the figure is presented to illustrate one embodiment of certain steps and/or operations that facilitate accessing a set of graph definitions to generate (e.g., create, update, etc.) various collaboration network graphs in response to receiving streams of event objects describing collaboration activity at a collaboration system (e.g., step 240 of FIG. 2). A representative scenario is also shown in the figure to illustrate an example application of collaboration network graph management technique 4A00.

The shown collaboration network graph management technique 4A00 implements two stages: a first stage 401 followed by a second stage 405. The first stage may run continuously to listen for collaboration events associated with a collaboration system (step 402). When collaboration events associated with a collaboration system are detected, event objects that correspond to collaboration activity (e.g., entity interaction events, entity affinity events, etc.) associated with the collaboration system are stored in graph data (step 404). Characteristics of the event are captured and processed for efficient storage and retrieval. In exemplary cases, the captured events are considered with respect to the active behavior overlays, which in turn may modify characteristics of the event with characteristics of the foregoing graph definitions. As such, event objects 122 can be combined with aspects of graph definitions 142 and stored in any form for rapid retrieval.

More particularly, in a second stage 405 that operates after the first stage, the stored and possibly augmented occurrences of event objects 122 are considered individually. As shown, for each event object detected, a graph definition associated with the event object is identified (step 406). In some cases, the graph definition might be identified in an electronic message (e.g., HTTP call) that comprises the event object. Various other event attributes are extracted from the event object (step 408). Such event attributes might include a description of the event type, or a timestamp that corresponds to when the event occurred. Lookup operations (e.g., retrieval of information from any data of the collaboration system) are performed such that certain entity details are collected in accordance with the graph definition (step 410). The entity details might be copied into a graph object (e.g., to capture entity details that are current as of the time of the event) to generate an updated collaboration network graph. Additionally, or as an alternative, operations of step 410 serve to generate an updated collaboration network graph by updating a graph object to include references to one or more places where entity details are stored. As an example, a graph definition might specify that certain object access permissions be attached to the event object for later processing (e.g., to perform permissions-based feed filtering).

The event attributes and entity details are incorporated into a set of graph data associated with a collaboration network graph (step 412). As illustrated in FIG. 4A, the event objects are applied to respective graph definitions which identify the instances of collaboration network graphs 342 in graph data 332 into which the event attributes and associated details are to be incorporated. A score for any entity relationships in the collaboration network graph affected by the event object is calculated (step 414). As indicated, such scores might be codified in instances of entity relationship score tables 442 that are stored in graph data 332. The scores are numerical representations of the relative strength of the entity relationships in a collaboration network graph. Such scores can be used, for example, to rank order the entity relationships as represented in an entity-specific collaboration feed derived from one or more collaboration network graphs.

The foregoing discussions include techniques for scoring entity relationships (e.g., graph edges), which techniques are disclosed in further detail as follows.

FIG. 4B1 and FIG. 4B2 depict an entity relationship scoring scenario 4B00 as performed in systems that facilitate on-demand generation of collaboration networks. As an option, one or more variations of entity relationship scoring scenario 4B00 or any aspect thereof may be implemented in the context of the architecture and functionality of the embodiments described herein. The entity relationship scoring scenario 4B00 or any aspect thereof may be implemented in any environment.

FIG. 4B1 and FIG. 4B2 illustrate aspects pertaining to implementing a framework at a collaboration system to facilitate on-demand generation of collaboration network graphs from high order configuration documents. Specifically, the figure is being presented to illustrate an example scenario showing a representative entity relationship (e.g., graph edge) scoring technique that can be facilitated by the herein disclosed techniques.

Referring to FIG. 4B1, the chart shows how interaction scores vary with time. As shown, at some arbitrary moment in time, an entity interaction event $116_1$ (e.g., user-to-object interaction) occurs, and an event object associated with the entity interaction event $116_1$ might be created to indicate that the event corresponds to a "preview" interaction between user "uM" and content object "fN" that has an interaction weight of "6". An incremental entity interaction score 424 that corresponds to entity interaction event $116_1$ is set to a value of 6 (e.g., equal to the interaction weight). A then-current entity interaction score 422 (e.g., "14") that was calculated at some earlier moment in time is updated in response to detecting the incoming occurrence of entity interaction event $116_1$. Updating the then-current entity interaction score 422 produces an adjusted then-current entity interaction score 426 that has a value of "2". As illustrated, adjusted then-current entity interaction score 426 might be determined based at least in part on some time decay function or time decay factor. Adjusted then-current entity interaction score 426 is established to represent the contribution in an updated entity interaction score 428 of any entity interaction activity prior to detecting the entity interaction event $116_1$. The updated entity interaction score 428 is determined from the incremental entity interaction score 424 and the adjusted then-current entity interaction score 426. Updated entity interaction score 428 (e.g., "8") is recording for the user "uM" and content object "fN" pair in a set of select entity interaction score vectors 420. The vector length (e.g., "54") for all user-to-object interactions associated with user "uM" is also recalculated and stored in select entity interaction score vectors 420.

The foregoing technique depicted in FIG. 4B1 is merely one possible technique involving applying a time decay function to recalculate a new entity interaction score. Other techniques might involve variations that include scaling or otherwise adjusting quantities pertaining to prior activities, and/or scaling or otherwise adjusting values pertaining to new interactions based at least in part on quantities pertaining to prior activities. In some scenarios, a predictor might use the foregoing techniques to compare and/or to make predictions pertaining to specific entity relationships, such as user-to-object relationships (e.g., to predict which user should receive a recommendation to access which files) and/or object-to-object relationships (e.g., to predict which file or groups of files are related to other files or groups of files).

As illustrated in FIG. 4B1, the adjusted then-current entity interaction scores might be time-decayed versions of the corresponding then-current entity interaction scores. One approach to calculating such a time-based decay might be a timestamp corresponding to the moment in time each entity interaction score is updated. Upon the occurrence of an entity interaction event that affects a particular entity interaction score, the timestamp can be retrieved and a time decay function can be used to calculate a time decay to apply to the then-current entity interaction score.

In some embodiments, multiple time-decay functions can be defined to accommodate different settings for the time-decay values that correspond to different types of interactions. For example, a first time-decay function having a first setting (e.g., 2) might be applied to content object read operations or interaction events, while a second time-decay function having a second setting (e.g., 1) might be applied to content object write operations or interaction events. A relatively larger (or relatively smaller) time-decay value applied to a particular type of interaction indicates a relatively shorter (or relatively longer) persistence in an entity interaction score. During event processing, a faster time decay function having a relatively larger time-decay value, or a slower time decay function having a relatively smaller time-decay value, can be selected based at least in part one or more characteristics of the interaction event being processed. In some cases, a time-based decay approach may not be applicable to certain entity relationships or events. For example, entity affinity events might merely be assigned a weighted score that remains static (e.g., with no decay) while the affinity is present.

In highly scalable and dynamic collaboration systems, the computing, storage, and networking resources used to store and retrieve the timestamps can be significant. In certain embodiments, the herein disclosed techniques facilitate elimination of timestamp storage and retrieval by embedding the timestamp into an incremental entity interaction score. EQ. 1 shows an example equation for calculating an incremental entity interaction score $IIS_j$ responsive to an interaction event that occurred at time $t_j$:

$$IIS_j = e^{-Kt_j} w_j \quad (EQ.\ 1)$$

where:
$IIS_j$=an instance j of an incremental entity interaction score,
$t_j$=the time of the interaction event invoking calculation of $IIS_j$,
$w_j$=the interaction weight of the interaction event, and
K=the adjustable time-decay value.

With this approach, an updated entity interaction score $UIS_k$ that corresponds to an interaction event that occurred at time $t_k$ can be calculated as shown in EQ. 2:

$$UIS_k = UIS_{TC} + IIS_k \quad (EQ.\ 2)$$

where:
$UIS_k$=an instance k of an updated entity interaction score,
$IIS_k$=an instance k of an incremental entity interaction score,
$t_k$=the time of the interaction event invoking calculation of $UIS_k$ and $IIS_k$,
$UIS_{TC}$=the then-current entity interaction score at time $t_k$, and
K=an adjustable time-decay value.

The foregoing equations EQ. 1 and EQ. 2 can be combined to construct a general formula for calculating an entity interaction score $IS_t$ for any time t:

$$IS_t = e^{Kt} UIS_{TC} \quad (EQ.\ 3)$$

where:
$IS_t$=the entity interaction score at time t,
K=an adjustable time-decay value, and
$UIS_{TC}$=the entity interaction score as of the time of the last interaction.

Data structures that contain the quantity $IS_t$ of EQ. 3 can be stored so as to be retrieved at any future time. Storage of the quantity of the most recent then-current entity interaction score $IS_t$ on an ongoing basis serves to keep a running value from which a subsequent time decayed value can be calculated at any subsequent time T=t using the time-decaying characteristics of EQ. 1 and EQ. 3.

Referring to FIG. 4B2, a flow of score components and other data to facilitate calculation of an entity relationship score in response to a detected entity interaction event is presented. The entity interaction event might be detected by receipt of an event object associated with the event. Specifically, entity interaction event $116_1$ earlier described might be detected. In the shown example, entity interaction event $116_2$ corresponds to a "preview" interaction with a content object "fN" by user "uM" that has an interaction weight of "6". Responsive to detecting the incoming occurrence of entity interaction event $116_2$, the highlighted portion of select entity interaction score vectors 420 is updated. For example, the "uM-fN" entity interaction score associated with user "uM" and content object "fN" is updated to "8", and the user "uM" vector length is updated to "54". Selected attributes associated with user "u1" and user "u2" are also shown in select entity interaction score vectors 420. Representative data pertaining to entity relationship scores that are current as of the time that entity interaction event $116_2$ is detected is also shown in select entity relationship score table data $482_1$. Specifically, scores (e.g., in "score" column fields) and dot-product score components (e.g., in "dotProd" column fields) for the "uM-u1", "uM-u2", and other user-to-user entity relationship pairs are shown.

According to the herein disclosed techniques, modifications to any of the entity interaction score vectors can invoke an entity relationship score update. To facilitate the update, certain score components are retrieved from the available data (e.g., in select entity interaction score vectors 420 and/or in select entity relationship score table data $482_1$). An example set of retrieved score components are shown in user "uM" score components 474i. As can be observed, the score components are derived from select entity interaction score vectors 420 and select entity relationship score table data $482_1$. The score components can be organized in accordance with a cosine-similarity formula 472. For example, the "uM-u2" score components comprise a dot-product numerator of "2867" from select entity relationship score table data $482_1$, and a denominator that includes a "uM" vector length of "54" and a "u2" vector length of "64" from select entity interaction score vectors 420.

As shown, some of the score components (e.g., the "uM" vector length) in user "uM" score components $474_1$ have been updated in response to the entity interaction event $116_2$. Other score components are updated in response to detecting the modification to select entity interaction score vectors 420. In this scenario, merely the "uM-u2" dot-product is affected by the detected modification and updated accordingly, as depicted in user "uM" score components 474₂. The score data comprising a set of select entity relationship score table data 482₂ is produced at least in part from user "uM" score components 474₂.

Further details regarding general approaches to scoring entity relationships are described in U.S. application Ser. No. 16/051,442 titled "FORMING EVENT-BASED RECOMMENDATIONS", filed on Jul. 31, 2018, which is hereby incorporated by reference in its entirety.

The foregoing discussions include techniques for forming entity-specific collaboration feeds from various collaboration networks graphs (e.g., step 250 of FIG. 2), which techniques are disclosed in further detail as follows.

Figure 5:
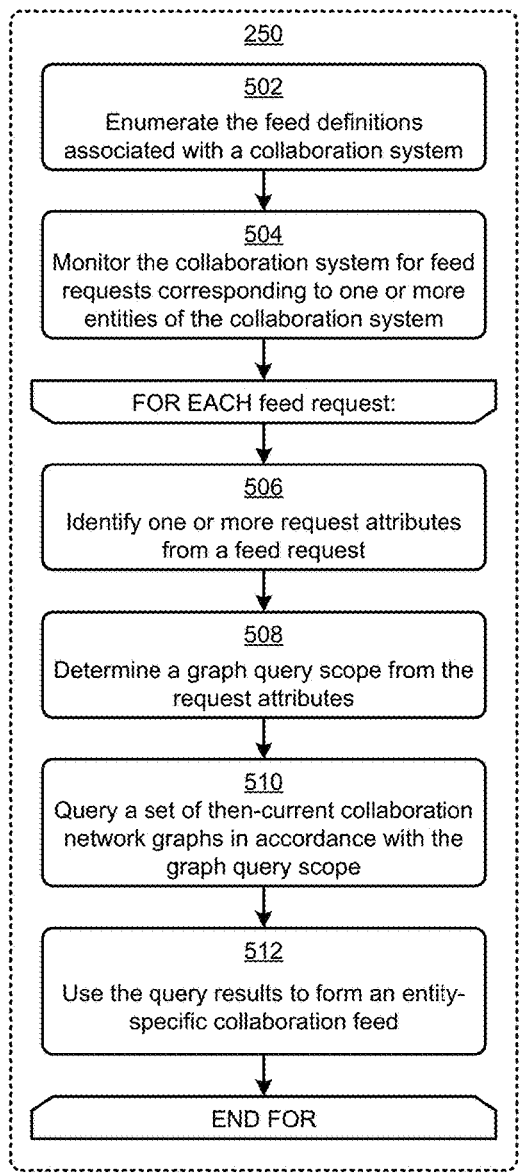
FIG. 5 depicts a feed generation technique as implemented in systems that facilitate on-demand generation of collaboration networks, according to an embodiment.
Figure 5:
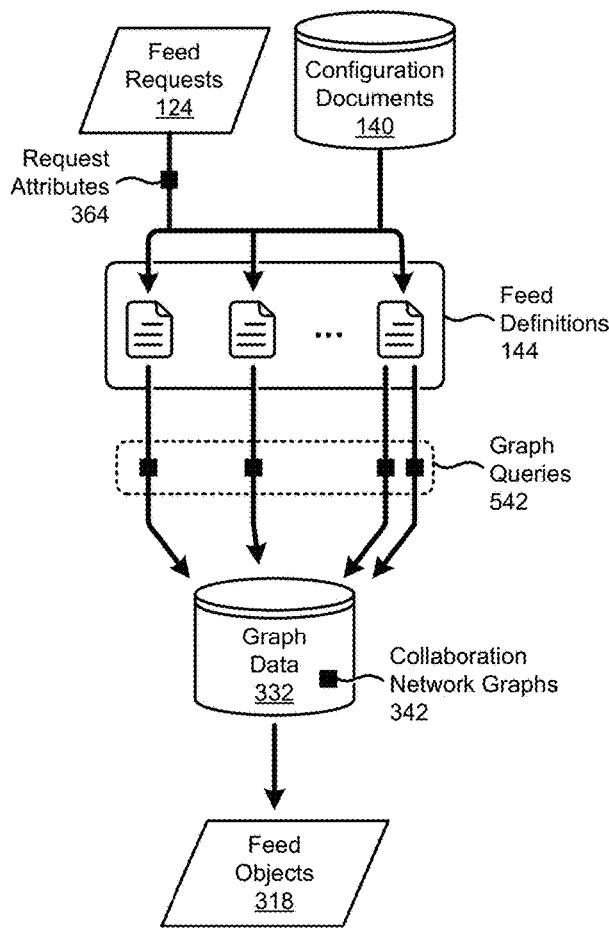

FIG. 5 depicts a feed generation technique 500 as implemented in systems that facilitate on-demand generation of collaboration networks. As an option, one or more variations of feed generation technique 500 or any aspect thereof may be implemented in the context of the architecture and functionality of the embodiments described herein. The feed generation technique 500 or any aspect thereof may be implemented in any environment.

FIG. 5 illustrates one aspect pertaining to implementing a framework at a collaboration system to facilitate on-demand generation of collaboration network graphs from high order configuration documents. Specifically, the figure is presented to illustrate one embodiment of certain steps and/or operations that facilitate forming entity-specific collaboration feeds from various collaboration network graphs based at least in part on respective feed definitions (e.g., step 250 of FIG. 2). A representative scenario is also shown in the figure to illustrate an example application of feed generation technique 500.

The feed generation technique 500 can commence by enumerating the feed definitions associated with a collaboration system (step 502). The collaboration system is also monitored for feed requests that correspond to one or more entities (e.g., users) of the collaboration system (step 504). For example, the foregoing feed definitions and feed requests can be represented by feed definitions 144 and feed requests 124, respectively, as illustrated in the figure. Additionally, in some embodiments, configuration documents 140 can be accessed whenever feed requests are received. In many cases, the feed requests are associated with multiple feed-oriented behavior overlays. More specifically, and as shown, a feed request can be mapped to the feed definitions used by the behavior overlays. The feed definitions, possibly in combination with the request attributes 364 and other information of the collaboration system, can be used to form queries (e.g., graph queries 542).

Multiple feed requests can be processed together. In some cases, feed requests are related in such a manner that information is shared by two or more feed requests, and as such, upon identifying that information is shared by two or more feed requests, high-performance queries can be formulated. In some cases, multiple feed requests can precipitate a single query. In other cases, a single feed request can precipitate multiple queries. Alternatively, or in addition, processing received feed requests can be performed on a request-by-request basis. One technique for processing feed requests on a request-by-request basis is now briefly discussed.

Specifically, for each feed request received, one or more request attributes from the feed request are identified (step 506). For example, a set of request attributes 364 associated with a particular feed request might comprise a feed definition identifier (e.g., to select from a set of feed definitions 144), an entity type, an entity identifier, and/or various other entity attributes. A graph query scope is determined from the request attributes (step 508). The graph query scope describes the set of constraints associated with a particular query over certain graph data. A graph query scope, for example, might comprise certain graph query statement parameters (e.g., SELECT statement and WHERE clause parameters) that at least in part determine the result set of the graph query. The graph data constituting a set of then-current collaboration network graphs are queried in accordance with the graph query scope (step 510). As illustrated in FIG. 5, the feed requests are applied to respective feed definitions which identify the graph query scopes of graph queries 542 that are executed over instances of collaboration network graphs 342 in graph data 332. Feed objects 318 derived from query result sets are then used to form respective instances of entity-specific collaboration feeds (step 512).

As earlier described, the entity-specific collaboration feeds derived from the collaboration network graphs can be presented in various forms at a user interface. Two representative examples of such presentation forms are discussed as follows.

Figure 6A:
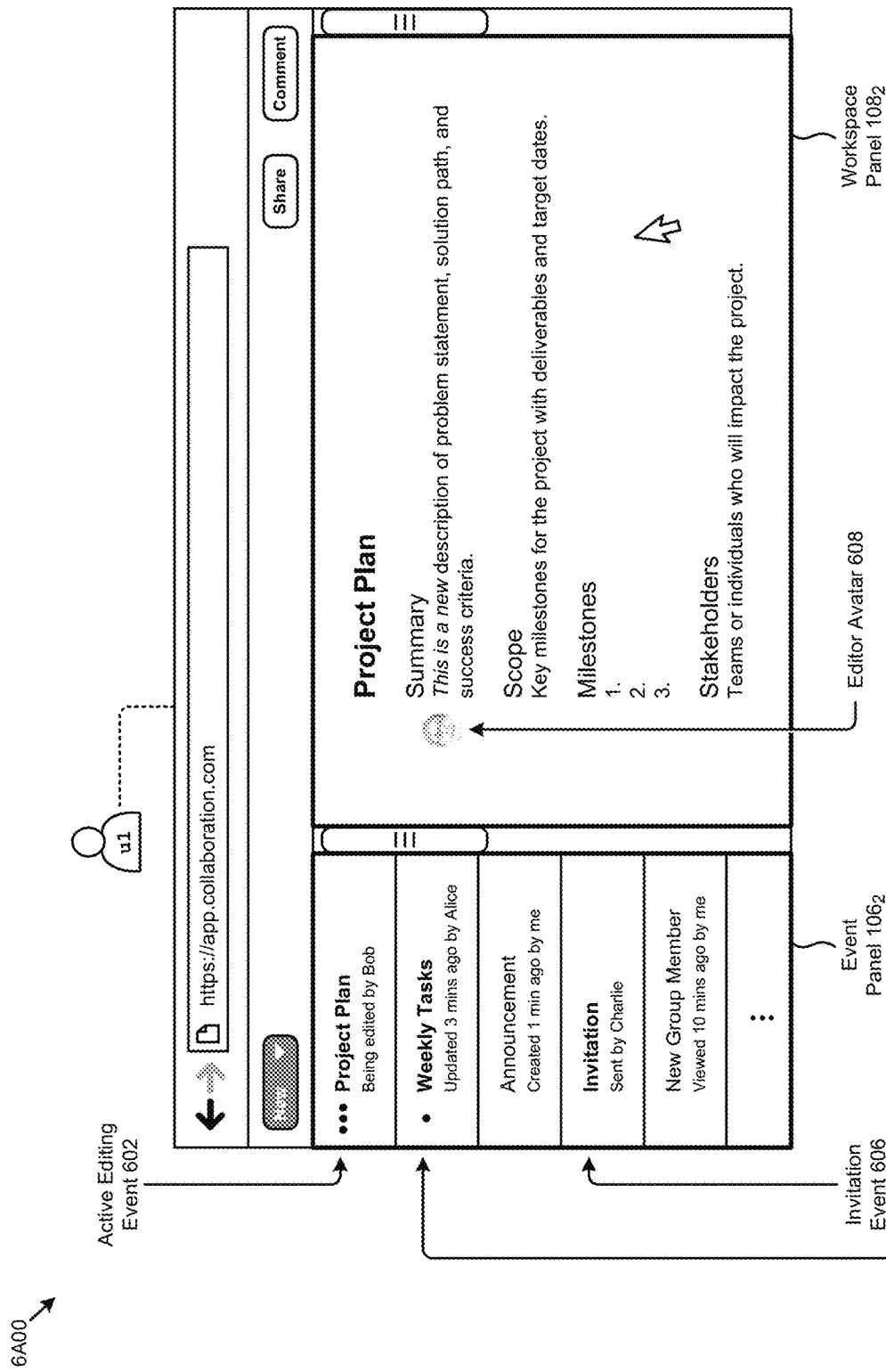
FIG. 6A presents a text-centric feed presentation technique as implemented in systems that facilitate on-demand generation of collaboration networks, according to an embodiment.

FIG. 6A presents a text-centric feed presentation technique 6A00 as implemented in systems that facilitate on-demand generation of collaboration networks. As an option, one or more variations of text-centric feed presentation technique 6A00 or any aspect thereof may be implemented in the context of the architecture and functionality of the embodiments described herein. The text-centric feed presentation technique 6A00 or any aspect thereof may be implemented in any environment.

FIG. 6A illustrates one aspect pertaining to implementing a framework at a collaboration system to facilitate on-demand generation of collaboration network graphs from high order configuration documents. Specifically, the figure is being presented to illustrate an example text-centric presentation of an entity-specific collaboration feed at a user interface.

As shown in FIG. 6A, a user interface rendered in a browser might comprise an event panel 106$_2$ and a workspace panel 108$_2$. As can be observed, a subject user "u1" of the user interface is interacting with a content object titled "Project Plan" in workspace panel 108$_2$. Furthermore, an entity-specific collaboration feed (e.g., specific to user "u1") is presented as an ordered list of event messages in event panel 106$_2$.

At the top of a display order in event panel 106$_2$ is an event message that corresponds to an active editing event 602. Specifically, this event message indicates that "Bob" is currently editing "Project Plan", which is the same document that is open in workspace panel 108$_2$. In certain embodiments, an editor avatar 608 associated with "Bob" might be displayed to indicate the portion of the content object that "Bob" is editing. A visual element (e.g., ellipsis) is also presented with the event message of active editing event 602 to indicate the continual nature of the event. An event message pertaining to a content object update event 604 is also presented in event panel 106$_2$. A bullet is presented with this event message to indicate the subject user has not viewed the underlying content object associated with the event. As another example, an event message corresponding to an invitation event 606 has a bolded title to indicate the subject user has not clicked on that particular message (e.g., to view and accept or reject the invitation).

Further details regarding general approaches to forming event messages are described in U.S. application Ser. No. 16/017,838 titled "PRESENTING COLLABORATION ACTIVITY", filed on Jun. 25, 2018, which is hereby incorporated by reference in its entirety.

Figure 6B:
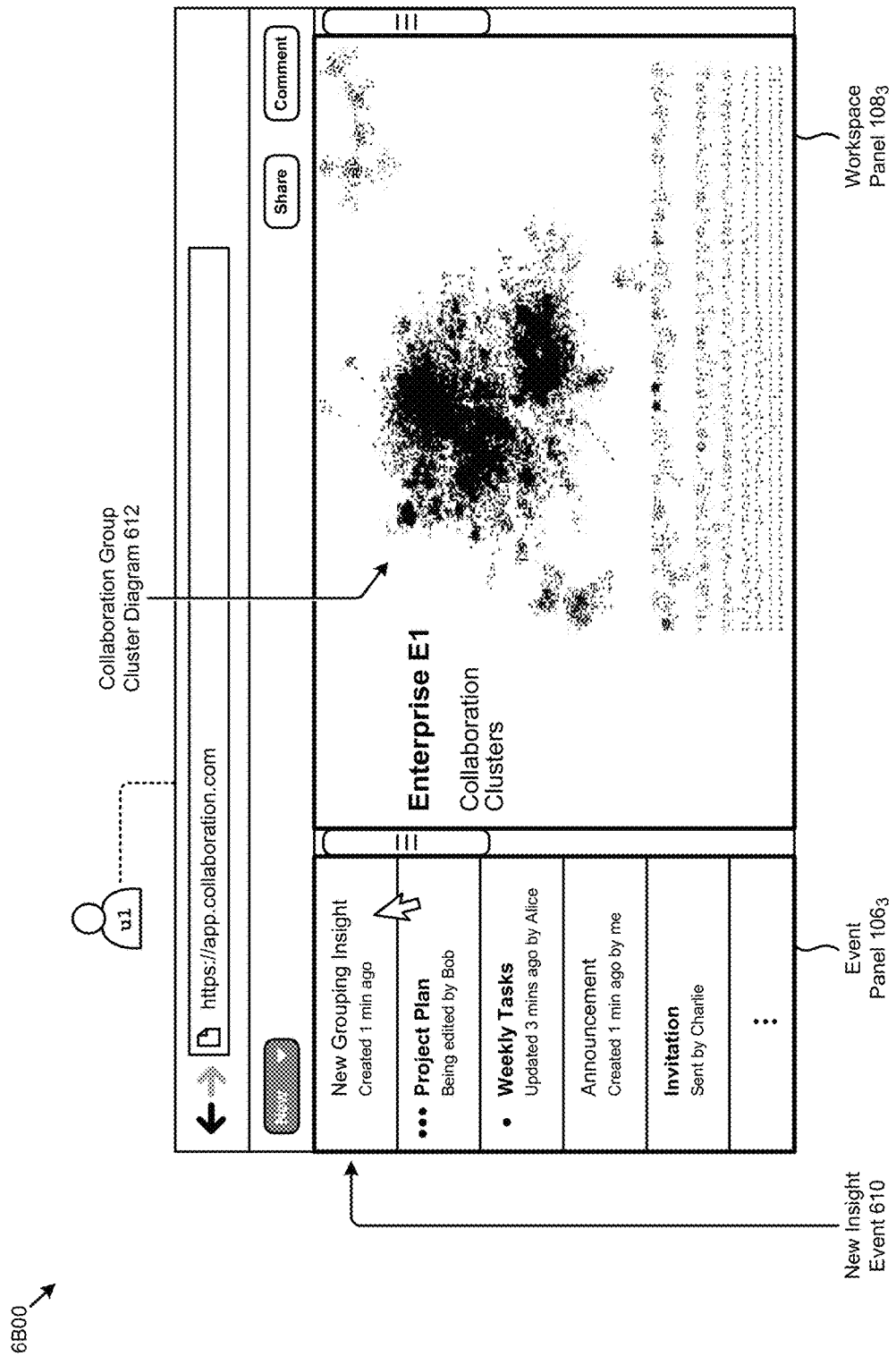
FIG. 6B presents a graphics-centric feed presentation technique as implemented in systems that facilitate on-demand generation of collaboration networks, according to an embodiment.

FIG. 6B presents a graphics-centric feed presentation technique 6B00 as implemented in systems that facilitate on-demand generation of collaboration networks. As an option, one or more variations of graphics-centric feed presentation technique 6B00 or any aspect thereof may be implemented in the context of the architecture and functionality of the embodiments described herein. The graphics-centric feed presentation technique 6B00 or any aspect thereof may be implemented in any environment.

FIG. 6B illustrates one aspect pertaining to implementing a framework at a collaboration system to facilitate on-demand generation of collaboration network graphs from high order configuration documents. Specifically, the figure is being presented to illustrate an example graphics-centric presentation of an entity-specific collaboration feed at a user interface.

As shown in FIG. 6B, a user interface rendered in a browser might comprise an event panel $106_3$ and a workspace panel $108_3$. As can be observed, an entity-specific collaboration feed that is specific to the subject user "u1" of the user interface is presented as an ordered list of event messages in event panel $106_3$.

At the top of a display order in event panel $106_3$ is an event message that corresponds to a new insight event 610. Specifically, this event message indicates that a "New Grouping Insight" that is specific to the subject user was created "1 minute ago". As an example, a cluster diagram characterizing the collaboration activity of the entities comprising enterprise "E1", of which the subject user is a member, might be generated from one or more collaboration network graphs according to the herein disclosed techniques. When the subject user selects the event message corresponding to new insight event 610, a collaboration group cluster diagram 612 associated with "Enterprise E1" is presented in workspace panel $108_3$ for examination by the user.

Further details regarding general approaches to clustering of collaboration entities are described in U.S. application Ser. No. 16/051,447 titled "SPONTANEOUS NETWORKING", filed on Jul. 31, 2018, which is hereby incorporated by reference in its entirety.

In some embodiments, during preparation of a text-centric or graphics-centric feed presentation, the system may generate emails that pertain to items that a user might have missed (e.g., the user did not generate any activity events pertaining to the particular item or items). An activity history as well as historical graphs can be used to determine which items are suspected of being missed. As such, the feed processor and/or the presentation generator can generate and present information that indicates which items are suspected of being missed. Furthermore, the aforementioned activity history and historical graphs can be used to inform a user folder feed items. Such folder feed items are presented as sharing suggestions. For example, folder feed items may be presented as "suggested folders" or as "sharing suggestions", etc.).

The foregoing discussions include techniques for testing certain features associated with one or more feed definitions, which techniques are disclosed in further detail as follows.

Figure 7:
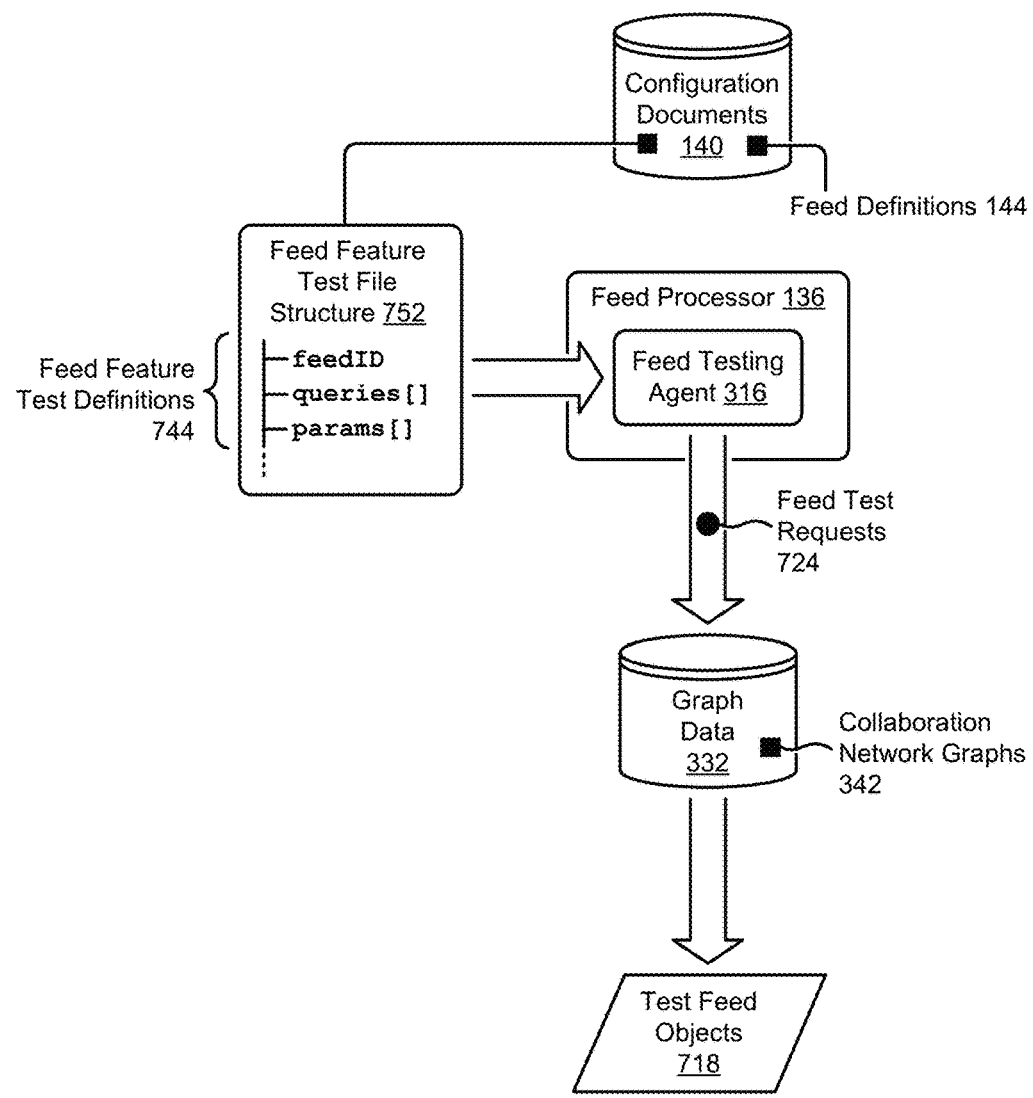
FIG. 7 exemplifies a feed testing technique as implemented in systems that facilitate on-demand generation of collaboration networks, according to an embodiment.

FIG. 7 exemplifies a feed testing technique 700 as implemented in systems that facilitate on-demand generation of collaboration networks. As an option, one or more variations of feed testing technique 700 or any aspect thereof may be implemented in the context of the architecture and functionality of the embodiments described herein. The feed testing technique 700 or any aspect thereof may be implemented in any environment.

FIG. 7 illustrates one aspect pertaining to implementing a framework at a collaboration system to facilitate on-demand generation of collaboration network graphs from high order configuration documents. Specifically, the figure is being presented to illustrate one embodiment of the components implemented according to the herein disclosed techniques to facilitate testing of certain features associated with a feed definition. Such feed testing capabilities might be used to verify that the then-current available graph data for a particular entity-specific collaboration feed is sufficient and/or is scalable.

As earlier described, feed testing technique 700 can be facilitated by feed testing agent 316 at feed processor 136 in a collaboration graph framework implemented in a collaboration system. Feed testing agent 316 accesses a feed feature test file from configuration documents 140 that comprises information organized according to a feed feature test file structure 752. As can be observed, feed feature test file structure 752 indicates that a corresponding configuration file in configuration documents 140 might describe instances of feed feature test definitions 744 associated with particular instances of feed definitions 144. As indicated, each feed feature test definition might describe a feed definition identifier (e.g., associated with a "feedID" key), one or more graph queries (e.g., associated with a "queries[ ]" object), one or more feed parameters (e.g., associated with a "params[ ]" object), and/or other feed feature testing information.

The foregoing feed feature test information is used to form instances of feed test requests 724 that are issued over the then-current set of collaboration network graphs 342 stored in graph data 332 to generate respective collections of test feed objects 718. For example, a graph service might receive the feed test requests 724 at an API and issue graph queries over graph data 332. Test feed objects 718 are then accessed to generate one or more entity-specific collaboration feeds that correspond to the desired feed feature being tested.

Additional Embodiments of the Disclosure

Additional Practical Application Examples

Figure 8A:
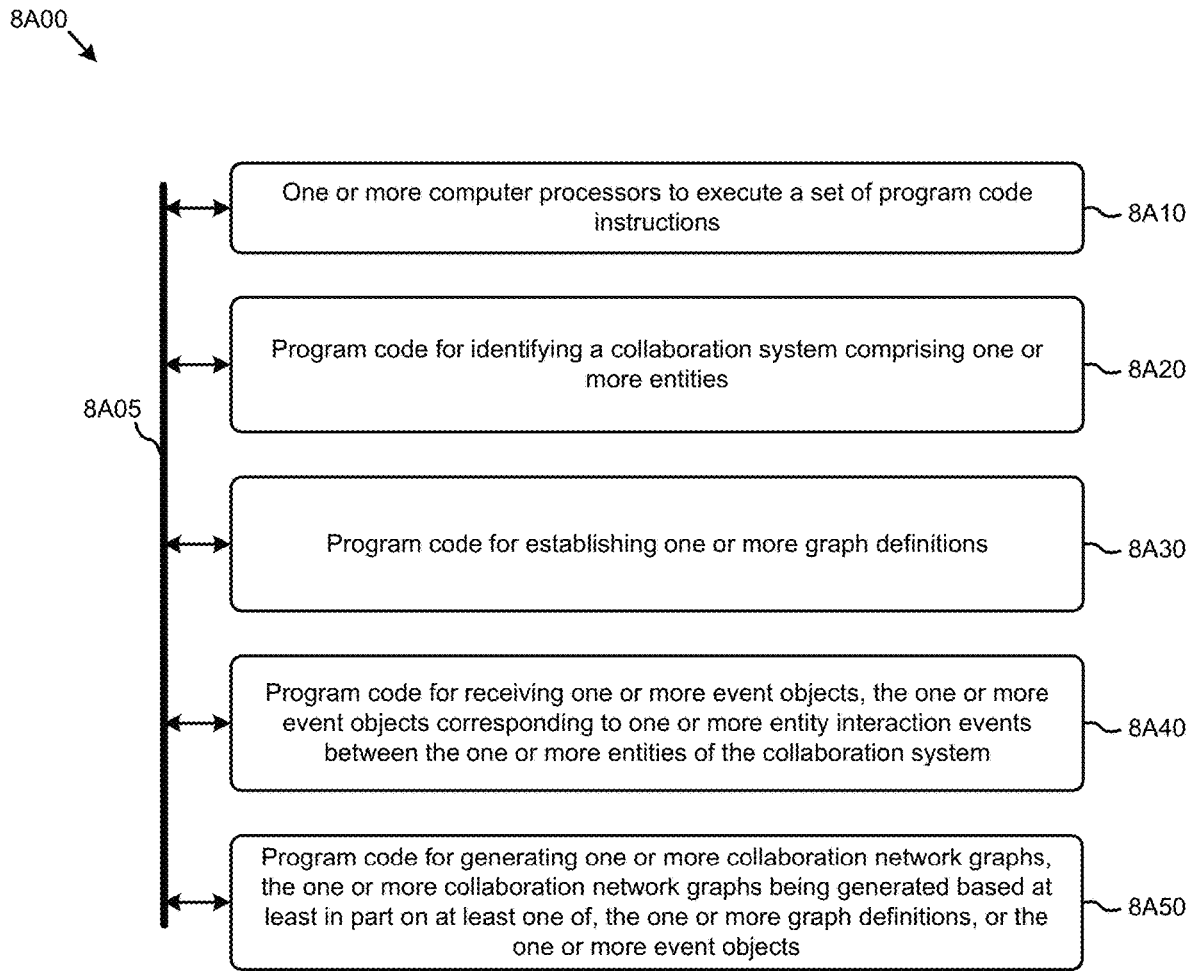
FIG. 8A and FIG. 8B depict system components as arrangements of computing modules that are interconnected so as to implement certain of the herein-disclosed embodiments.

FIG. 8A depicts a system 8A00 as an arrangement of computing modules that are interconnected so as to operate cooperatively to implement certain of the herein-disclosed embodiments. This and other embodiments present particular arrangements of elements that, individually or as combined, serve to form improved technological processes that address the extensive code development effort needed to deliver collaboration activity insights to users of collaboration systems. The partitioning of system 8A00 is merely illustrative and other partitions are possible. As an option, the system 8A00 may be implemented in the context of the architecture and functionality of the embodiments described herein. Of course, however, the system 8A00 or any operation therein may be carried out in any desired environment.

The system 8A00 comprises at least one processor and at least one memory, the memory serving to store program instructions corresponding to the operations of the system. As shown, an operation can be implemented in whole or in part using program instructions accessible by a module. The modules are connected to a communication path 8A05, and any operation can communicate with any other operations over communication path 8A05. The modules of the system can, individually or in combination, perform method operations within system 8A00. Any operations performed within system 8A00 may be performed in any order unless as may be specified in the claims.

The shown embodiment implements a portion of a computer system, presented as system 8A00, comprising one or more computer processors to execute a set of program code instructions (module 8A10) and modules for accessing memory to hold program code instructions to perform: identifying a collaboration system comprising one or more entities (module 8A20); establishing one or more graph definitions (module 8A30); receiving one or more event objects, the one or more event objects corresponding to one or more entity interaction events between the one or more entities (module 8A40); and generating one or more collaboration network graphs, the one or more collaboration network graphs being generated based at least in part on at least one of, the one or more graph definitions, or the one or more event objects (module 8A50).

Variations of the foregoing may include more or fewer of the shown modules. Certain variations may perform more or fewer (or different) steps and/or certain variations may use data elements in more or in fewer or different operations. Still further, some embodiments include variations in the operations performed, and some embodiments include variations of aspects of the data elements used in the operations.

Figure 8B:
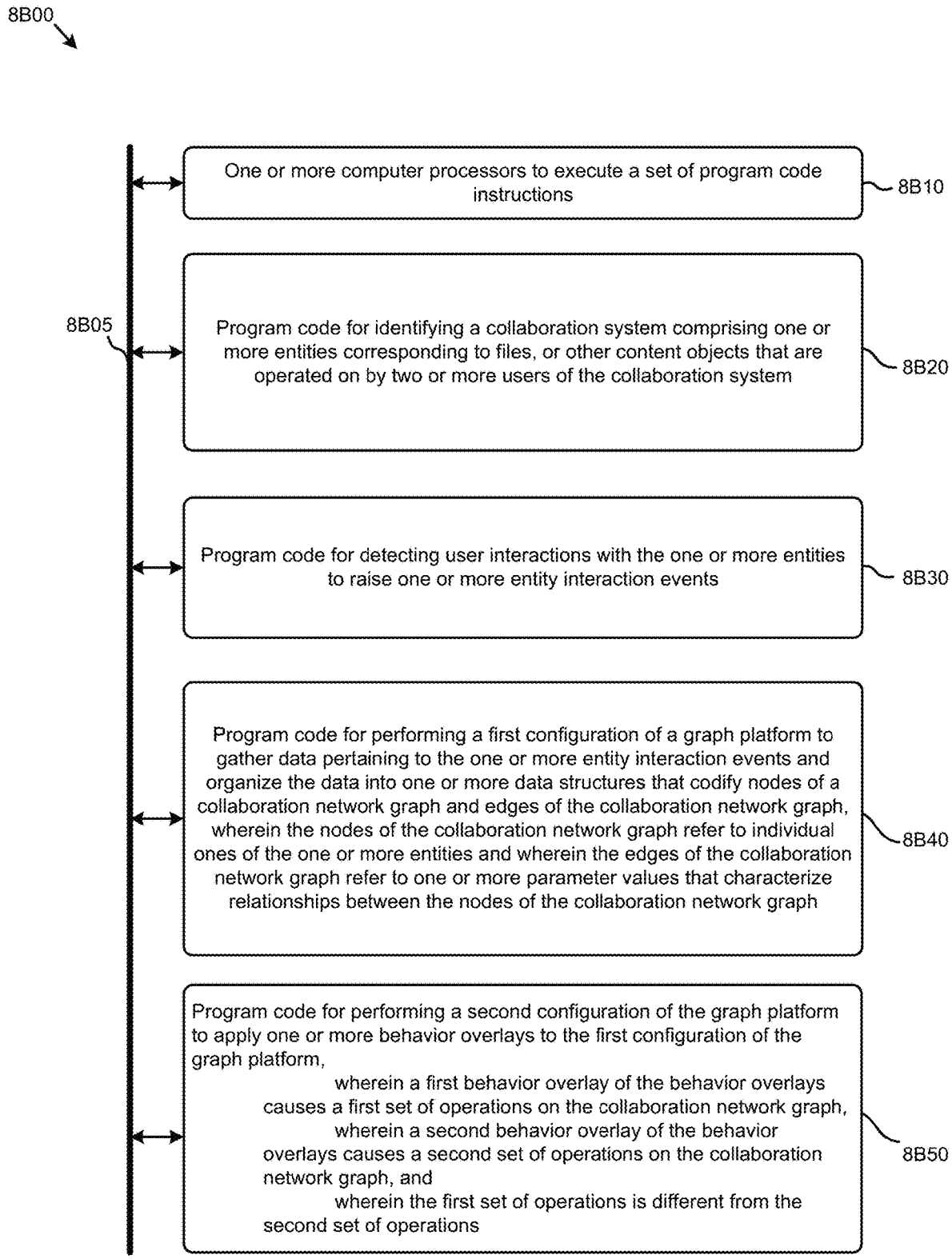

FIG. 8B depicts a system 8B00 as an arrangement of computing modules that are interconnected so as to operate cooperatively to implement certain of the herein-disclosed embodiments. The partitioning of system 8B00 is merely illustrative and other partitions are possible. As an option, the system 8B00 may be implemented in the context of the architecture and functionality of the embodiments described herein. Of course, however, the system 8B00 or any operation therein may be carried out in any desired environment. The system 8B00 comprises at least one processor and at least one memory, the memory serving to store program instructions corresponding to the operations of the system. As shown, an operation can be implemented in whole or in part using program instructions accessible by a module. The modules are connected to a communication path 8B05, and any operation can communicate with any other operations over communication path 8B05. The modules of the system can, individually or in combination, perform method operations within system 8B00. Any operations performed within system 8B00 may be performed in any order unless as may be specified in the claims. The shown embodiment implements a portion of a computer system, presented as system 8B00, comprising one or more computer processors to execute a set of program code instructions (module 8B10) and modules for accessing memory to hold program code instructions to perform: identifying a collaboration system comprising one or more entities corresponding to files, or other content objects that are operated on by two or more users of the collaboration system (module 8B20); detecting user interactions with the one or more entities to raise one or more entity interaction events (module 8B30); performing a first configuration of a graph platform to gather data pertaining to the one or more entity interaction events and organize the data into one or more data structures that codify nodes of a collaboration network graph and edges of the collaboration network graph, wherein the nodes of the collaboration network graph refer to individual ones of the one or more entities and wherein the edges of the collaboration network graph refer to one or more parameter values that characterize relationships between the nodes of the collaboration network graph (module 8B40); and performing a second configuration of the graph platform to apply one or more behavior overlays to the first configuration of the graph platform, wherein a first behavior overlay of the behavior overlays causes a first set of operations on the collaboration network graph, wherein a second behavior overlay of the behavior overlays causes a second set of operations on the collaboration network graph, and wherein the first set of operations is different from the second set of operations (module 8B50).

System Architecture Overview

Additional System Architecture Examples

Figure 9A:
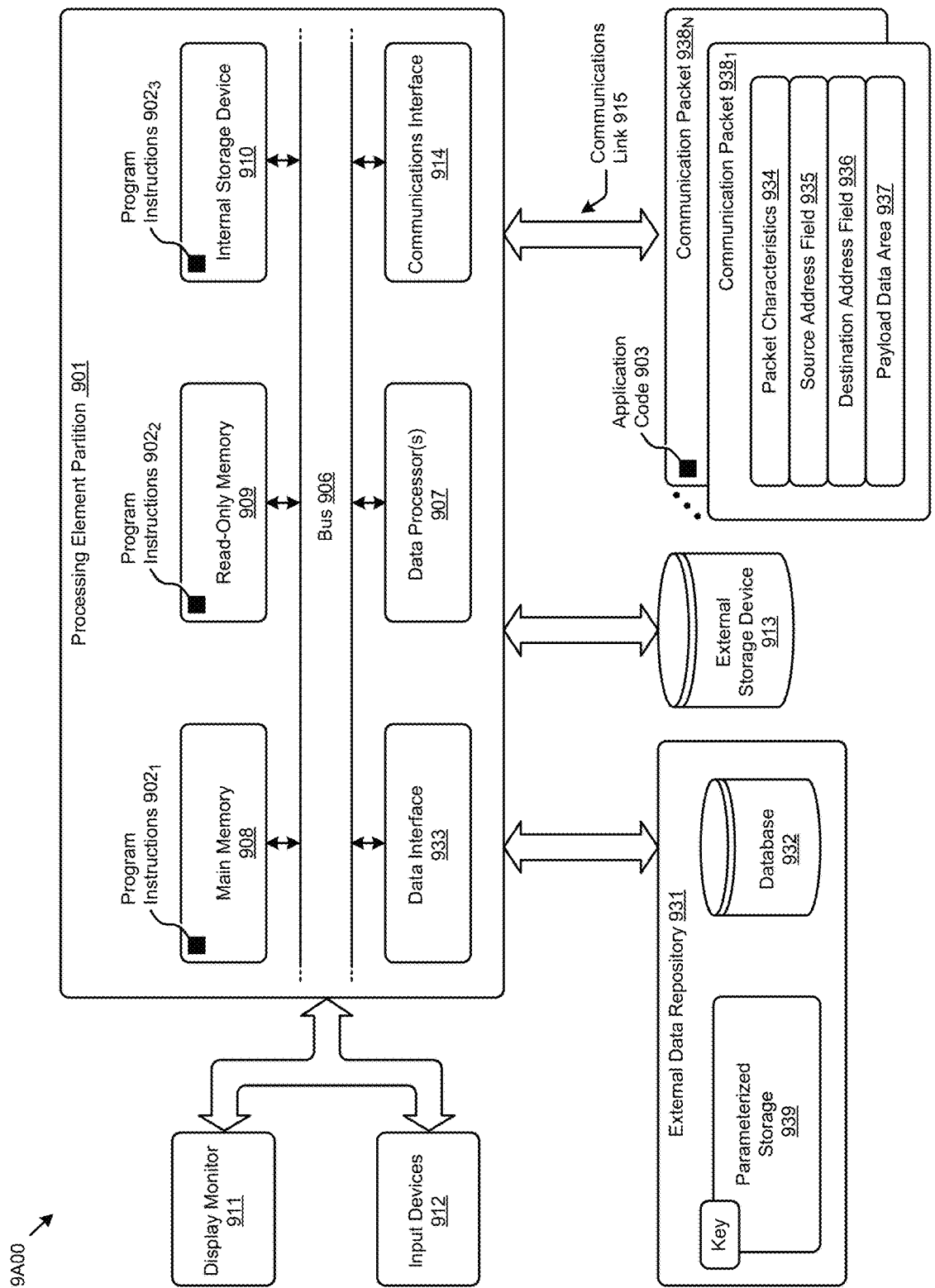
FIG. 9A and FIG. 9B present block diagrams of computer system architectures having components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a central processing unit (CPU), or a multi-core CPU (e.g., data processor 907), a system memory (e.g., main memory 908, or an area of random access memory (RAM)), a non-volatile storage device or non-volatile storage area (e.g., read-only memory 909), an internal storage device 910 or external storage device 913 (e.g., magnetic or optical), a data interface 933, a communications interface 914 (e.g., PHY, MAC, Ethernet interface, modem, etc.). The aforementioned components are shown within processing element partition 901, however other partitions are possible. Computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by data processor 907 executing one or more sequences of one or more program code instructions contained in a memory. Such instructions (e.g., program instructions 9021, program instructions 9022, program instructions 9023, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 9A00 performs specific networking operations using one or more instances of communications interface 914. Instances of communications interface 914 may comprise one or more networking ports that are configurable (e.g., pertaining to speed, protocol, physical layer characteristics, media access characteristics, etc.) and any particular instance of communications interface 914 or port thereto can be configured differently from any other particular instance. Portions of a communication protocol can be carried out in whole or in part by any instance of communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

Communications link 915 can be configured to transmit (e.g., send, receive, signal, etc.) any types of communications packets (e.g., communication packet $938_1$, communication packet $938_N$) comprising any organization of data items. The data items can comprise a payload data area 937, a destination address 936 (e.g., a destination IP address), a source address 935 (e.g., a source IP address), and can include various encodings or formatting of bit fields to populate packet characteristics 934. In some cases, the packet characteristics include a version identifier, a packet or payload length, a traffic class, a flow label, etc. In some cases, payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of a computer system 9A00. According to certain embodiments of the disclosure, two or more instances of computer system 9A00 coupled by a communications link 915 (e.g., LAN, public switched telephone network, or wireless network) may perform the sequence of instructions required to practice embodiments of the disclosure using two or more instances of components of computer system 9A00.

Computer system 9A00 may transmit and receive messages such as data and/or instructions organized into a data structure (e.g., communications packets). The data structure can include program instructions (e.g., application code 903), communicated through communications link 915 and communications interface 914. Received program code may be executed by data processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

Processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to on-demand generation of collaboration networks. A module may include one or more state machines and/or combinational logic used to implement or facilitate the operational and/or performance characteristics pertaining to on-demand generation of collaboration networks from configuration files.

Various implementations of database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of on-demand generation of collaboration networks). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to on-demand generation of collaboration networks, and/or for improving the way data is manipulated when performing computerized operations pertaining to implementing a framework at a collaboration system to facilitate on-demand generation of collaboration network graphs from high order configuration documents.

Figure 9B:
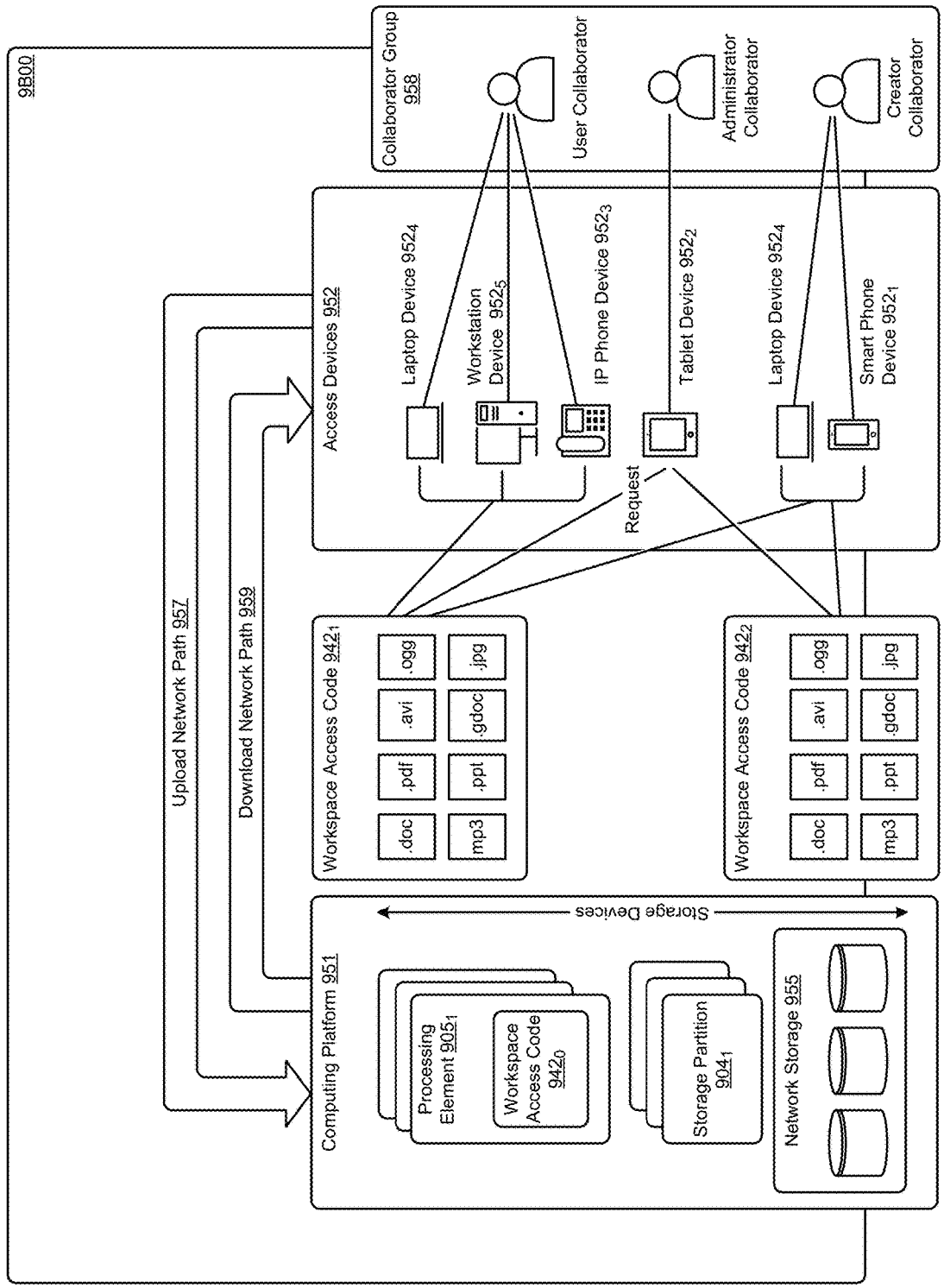

FIG. 9B depicts a block diagram of an instance of a cloud-based environment 9B00. Such a cloud-based environment supports access to workspaces through the execution of workspace access code (e.g., workspace access code 9420, workspace access code 9421, and workspace access code 9422). Workspace access code can be executed on any of access devices 952 (e.g., laptop device 9524, workstation device 9525, IP phone device 9523, tablet device 9522, smart phone device 9521, etc.), and can be configured to access any type of object. Strictly as examples, such objects can be folders or directories or can be files of any filetype. A group of users can form a collaborator group 958, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 951, including in a middleware setting. As shown, a portion of the workspace access code resides in and can be executed on one or more processing elements (e.g., processing element $905_1$). The workspace access code can interface with storage devices such as networked storage 955. Storage of workspaces and/or any constituent files or objects, and/or any other code or scripts or data can be stored in any one or more storage partitions (e.g., storage partition $904_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 957). A stored workspace can be delivered to a particular user and/or shared with other particular users via a download (e.g., a download from a processing element to an access device over a download network path 959).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A computer implemented method for on-demand generation of a collaboration network graph comprising:
    detecting a user interaction with one or more entities to raise one or more entity interaction events at a collaboration system, the collaboration system comprising the one or more entities corresponding to files or other content objects that are operated on by two or more users of the collaboration system;
    performing a first configuration of a graph platform to gather data pertaining to the one or more entity interaction events and organize the data into one or more data structures that codify nodes of a collaboration network graph and edges of the collaboration network graph, wherein the nodes of the collaboration network graph refer to individual ones of the one or more entities and wherein the edges of the collaboration network graph refer to one or more parameter values that characterize relationships between the nodes of the collaboration network graph;
    performing a second configuration of the graph platform to apply one or more behavior overlays to the first configuration of the graph platform,
        wherein a first behavior overlay of the behavior overlays causes a first set of operations on the collaboration network graph,
        wherein a second behavior overlay of the behavior overlays causes a second set of operations on the collaboration network graph, and
        wherein the first set of operations is different from the second set of operations;
    establishing at least one feed definition;
    receiving at least one feed request, the at least one feed request referencing the at least one feed definition in one or more request attributes; and
    generating, in response to receiving the at least one feed request, one or more entity-specific collaboration feeds, the one or more entity-specific collaboration feeds being generated based at least in part on the collaboration network graph and at least one of the first behavior overlay or the second behavior overlay.

2. The method of claim 1, further comprising:
    presenting at least one of the one or more entity-specific collaboration feeds in at least one user interface.

3. The method of claim 1, wherein at least one of the one or more entity-specific collaboration feeds comprises one or more feed objects.

4. The method of claim 1, wherein the at least one feed request is a feed test request, the feed test request being received to test a portion of the at least one feed definition.

5. The method of claim 1, wherein at least one of the one or more entity-specific collaboration feeds is generated from two or more collaboration network graphs.

6. The method of claim 1, further comprising receiving at an API, one or more event objects.

7. The method of claim 6, wherein at least one of the one or more event objects corresponds to at least one affinity between two or more of the one or more entities.

8. The method of claim 1, further comprising:
    calculating at least one score that is associated with a respective at least one of the edges of the collaboration network graph.

9. The method of claim 1, wherein the first behavior overlay corresponds to a first graph definition.

10. The method of claim 1, wherein the second behavior overlay corresponds to a second graph definition.

11. The method of claim 1, further comprising a third behavior overlay.

12. The method of claim 11, wherein the third behavior overlay is configured using one or more feed definitions, or one or more entity relationship scoring techniques, or one or more feed feature test definitions.

13. The method of claim 12, wherein at least one of the one or more feed definitions, or the one or more entity relationship scoring techniques, or the one or more feed feature test definitions, is codified in uncompiled, structured text.

14. A non-transitory computer readable medium having stored thereon a sequence of instructions which, when executed by a processor causes a set of acts for on-demand generation of a collaboration network graph, the set of acts comprising:
    detecting a user interaction with one or more entities to raise one or more entity interaction events at a collaboration system, the collaboration system comprising the one or more entities corresponding to files or other content objects that are operated on by two or more users of the collaboration system;
    performing a first configuration of a graph platform to gather data pertaining to the one or more entity interaction events and organize the data into one or more data structures that codify nodes of a collaboration network graph and edges of the collaboration network graph, wherein the nodes of the collaboration network graph refer to individual ones of the one or more entities and wherein the edges of the collaboration network graph refer to one or more parameter values that characterize relationships between the nodes of the collaboration network graph;
    performing a second configuration of the graph platform to apply one or more behavior overlays to the first configuration of the graph platform,
        wherein a first behavior overlay of the behavior overlays causes a first set of operations on the collaboration network graph,
        wherein a second behavior overlay of the behavior overlays causes a second set of operations on the collaboration network graph, and
        wherein the first set of operations is different from the second set of operations;

establishing at least one feed definition;

receiving at least one feed request, the at least one feed request referencing the at least one feed definition in one or more request attributes; and generating, in response to receiving the at least one feed request, one or more entity-specific collaboration feeds, the one or more entity-specific collaboration feeds being generated based at least in part on the collaboration network graph and at least one of the first behavior overlay or the second behavior overlay.

15. The computer readable medium of claim 14, wherein the set of acts further comprise:

presenting at least one of the one or more entity-specific collaboration feeds in at least one user interface.

16. The computer readable medium of claim 14, wherein at least one of the one or more entity-specific collaboration feeds comprises one or more feed objects.

17. A computing system for on-demand generation of a collaboration network graph comprising:

a storage medium having stored thereon a sequence of instructions; and a processor that executes the sequence of instructions to cause a set of acts, the set of acts comprising, detecting a user interaction with one or more entities to raise one or more entity interaction events at a collaboration system, the collaboration system comprising the one or more entities corresponding to files or other content objects that are operated on by two or more users of the collaboration system;

performing a first configuration of a graph platform to gather data pertaining to the one or more entity interaction events and organize the data into one or more data structures that codify nodes of a collaboration network graph and edges of the collaboration network graph, wherein the nodes of the collaboration network graph refer to individual ones of the one or more entities and wherein the edges of the collaboration network graph refer to one or more parameter values that characterize relationships between the nodes of the collaboration network graph;

performing a second configuration of the graph platform to apply one or more behavior overlays to the first configuration of the graph platform, wherein a first behavior overlay of the behavior overlays causes a first set of operations on the collaboration network graph, wherein a second behavior overlay of the behavior overlays causes a second set of operations on the collaboration network graph, and wherein the first set of operations is different from the second set of operations;

establishing at least one feed definition;

receiving at least one feed request, the at least one feed request referencing the at least one feed definition in one or more request attributes; and generating, in response to receiving the at least one feed request, one or more entity-specific collaboration feeds, the one or more entity-specific collaboration feeds being generated based at least in part on the collaboration network graph and at least one of the first behavior overlay or the second behavior overlay.

18. The computing system of claim 17, wherein the first behavior overlay corresponds to a first graph definition.

19. The computer readable medium of claim 14, wherein the at least one feed request is a feed test request, the feed test request being received to test a portion of the at least one feed definition.

20. The computer readable medium of claim 14, wherein at least one of the one or more entity-specific collaboration feeds is generated from two or more collaboration network graphs.

* * * * *